US011246143B2

(12) United States Patent
Wang et al.

(10) Patent No.: US 11,246,143 B2
(45) Date of Patent: Feb. 8, 2022

(54) BEAMFORMING ENHANCEMENT VIA STRATEGIC RESOURCE UTILIZATION

(71) Applicant: Google LLC, Mountain View, CA (US)

(72) Inventors: Jibing Wang, Saratoga, CA (US); Erik Richard Stauffer, Sunnyvale, CA (US); Aamir Akram, San Jose, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/844,093

(22) Filed: Dec. 15, 2017

(65) Prior Publication Data
US 2019/0191440 A1 Jun. 20, 2019

(51) Int. Cl.
H04W 72/08 (2009.01)
H04L 5/00 (2006.01)
(Continued)

(52) U.S. Cl.
CPC ........ H04W 72/085 (2013.01); H04B 7/0452 (2013.01); H04B 7/0695 (2013.01);
(Continued)

(58) Field of Classification Search
CPC ............. H04W 72/085; H04W 72/046; H04W 72/048; H04W 72/042; H04W 72/121;
(Continued)

(56) References Cited
U.S. PATENT DOCUMENTS 5,543,811 A 8/1996 Chethik
6,711,224 B1 3/2004 Benning et al.
(Continued)

FOREIGN PATENT DOCUMENTS

CN 102523034 6/2012
CN 106357321 1/2017
(Continued)

OTHER PUBLICATIONS

"Evolved Universal Terrestrial Radio Access (E-UTRA)", 3rd Generation Partnership Project; Technical Specification Group Radio Access Network; Evolved Universal Terrestrial Radio Access (E-UTRA); Radio Resource Control (RRC); Protocol specification (Release 10), Mar. 2013, 307 pages.
(Continued)

Primary Examiner — Shah M Rahman
(74) Attorney, Agent, or Firm — Colby Nipper PLLC

(57) ABSTRACT

The present disclosure describes methods and apparatuses for beamforming enhancement via strategic resource utilization. In some aspects, an air interface resource is used for exchanging wireless communications using one or more signal beams. In some implementations, end-user devices are classified into a beamforming state—such as active, idle, or inactive—based on an activity level with a base station. To facilitate antenna beamforming between the base station and an end-user device, opportunities for beamforming training are provided by strategically granting resource units based on one or more resource allocation rules. For example, both control and data information can be allocated together on the same frequencies for each end-user device. Also, an uplink or a downlink grant can be provided that precedes a downlink or an uplink allocation, respectively. In some implementations, the resource allocation rules are applied based on the beamforming state to which an end-user device has been classified.

20 Claims, 13 Drawing Sheets

(51) Int. Cl.
*H04B 7/06* (2006.01)
*H04B 7/0452* (2017.01)
*H04W 72/04* (2009.01)
*H04W 52/02* (2009.01)
*H04W 72/12* (2009.01)

(52) U.S. Cl.
CPC .......... *H04L 5/0023* (2013.01); *H04L 5/0044* (2013.01); *H04L 5/0076* (2013.01); *H04L 5/0094* (2013.01); *H04W 72/046* (2013.01); *H04W 72/048* (2013.01); *H04L 5/0037* (2013.01); *H04L 5/0048* (2013.01); *H04L 5/0053* (2013.01); *H04L 5/0082* (2013.01); *H04W 52/0251* (2013.01); *H04W 72/042* (2013.01); *H04W 72/121* (2013.01)

(58) Field of Classification Search
CPC ............. H04W 52/0251; H04L 5/0023; H04L 5/0037; H04L 5/0044; H04L 5/0048; H04L 5/0053; H04L 5/0076; H04L 5/0082; H04L 5/0094; H04B 7/0452; H04B 7/0695
See application file for complete search history.

(56) References Cited

U.S. PATENT DOCUMENTS

| | | | |
|---|---|---|---|
| 8,315,185 | B2 | 11/2012 | Chan |
| 8,346,286 | B2 | 1/2013 | Lee et al. |
| 8,543,063 | B2 | 9/2013 | Bergel et al. |
| 8,594,053 | B2 | 11/2013 | Kim et al. |
| 8,605,644 | B2 | 12/2013 | Wang |
| 8,681,809 | B2 | 3/2014 | Sambhwani et al. |
| 8,774,150 | B1 * | 7/2014 | Jeffery ................ H04B 7/0617 370/338 |
| 8,923,192 | B2 | 12/2014 | Gong |
| 8,958,382 | B2 | 2/2015 | Kim et al. |
| 9,060,324 | B1 | 6/2015 | Goyal et al. |
| 9,124,395 | B2 | 9/2015 | Lin et al. |
| 9,204,441 | B2 | 12/2015 | Nagaraja et al. |
| 9,253,766 | B2 * | 2/2016 | Yang ................... H04B 7/2656 |
| 9,258,798 | B2 | 2/2016 | Li et al. |
| 9,271,290 | B2 | 2/2016 | Pelletier et al. |
| 9,332,456 | B2 * | 5/2016 | Heo .......................... H04L 5/14 |
| 9,414,430 | B2 | 8/2016 | Vajapeyam et al. |
| 9,425,923 | B2 | 8/2016 | Ratasuk et al. |
| 9,648,637 | B2 | 5/2017 | Yang et al. |
| 9,681,451 | B1 | 6/2017 | Liu et al. |
| 9,686,667 | B2 | 6/2017 | Artuso |
| 9,900,133 | B2 | 2/2018 | Lu et al. |
| 10,080,244 | B2 | 9/2018 | Lei et al. |
| 10,084,535 | B1 | 9/2018 | Speidel et al. |
| 10,148,329 | B2 | 12/2018 | Yue et al. |
| 10,218,422 | B2 | 2/2019 | Raghavan et al. |
| 10,375,671 | B2 | 8/2019 | Stauffer et al. |
| 10,512,008 | B2 | 12/2019 | Deenoo et al. |
| 10,524,266 | B2 | 12/2019 | Wang |
| 10,608,721 | B2 | 3/2020 | Wang et al. |
| 10,700,769 | B2 | 6/2020 | Wang et al. |
| 10,779,303 | B2 | 9/2020 | Wang et al. |
| 10,868,654 | B2 | 12/2020 | Wang et al. |
| 11,006,413 | B2 | 5/2021 | Wang et al. |
| 2005/0047322 | A1 | 3/2005 | Sondur |
| 2006/0205346 | A1 | 9/2006 | Evans et al. |
| 2008/0018427 | A1 | 1/2008 | Ezra et al. |
| 2009/0102715 | A1 | 4/2009 | Lou et al. |
| 2009/0116569 | A1 | 5/2009 | Jin |
| 2009/0180451 | A1 | 7/2009 | Alpert et al. |
| 2010/0194650 | A1 | 8/2010 | Goransson et al. |
| 2010/0304680 | A1 | 12/2010 | Kuffner et al. |
| 2011/0002373 | A1 | 1/2011 | Jeon |
| 2011/0128866 | A1 | 6/2011 | Tian et al. |
| 2011/0205981 | A1 | 8/2011 | Koo et al. |
| 2012/0027111 | A1 | 2/2012 | Vook et al. |
| 2012/0039280 | A1 | 2/2012 | Chen et al. |
| 2012/0140743 | A1 | 6/2012 | Pelletier et al. |
| 2012/0208547 | A1 | 8/2012 | Geirhofer et al. |
| 2012/0275384 | A1 | 11/2012 | Long et al. |
| 2012/0295623 | A1 | 11/2012 | Siomina et al. |
| 2013/0155975 | A1 | 6/2013 | Dinan |
| 2013/0223251 | A1 | 8/2013 | Li et al. |
| 2013/0286960 | A1 | 10/2013 | Li et al. |
| 2013/0288667 | A1 | 10/2013 | Tsui et al. |
| 2013/0301454 | A1 | 11/2013 | Seol et al. |
| 2014/0146732 | A1 | 5/2014 | Olufunmilo et al. |
| 2014/0148107 | A1 | 5/2014 | Maltsev et al. |
| 2014/0211739 | A1 | 7/2014 | Kim et al. |
| 2014/0213277 | A1 | 7/2014 | Jang |
| 2014/0307693 | A1 | 10/2014 | Feng et al. |
| 2014/0362752 | A1 | 12/2014 | Jha et al. |
| 2014/0362811 | A1 | 12/2014 | Lin et al. |
| 2015/0065133 | A1 | 3/2015 | Cui et al. |
| 2015/0126239 | A1 | 5/2015 | Kim et al. |
| 2015/0208458 | A1 | 7/2015 | Pelletier et al. |
| 2015/0289147 | A1 * | 10/2015 | Lou ....................... H04B 7/0413 370/329 |
| 2015/0382205 | A1 | 12/2015 | Lee et al. |
| 2016/0014664 | A1 | 1/2016 | Singh et al. |
| 2016/0029235 | A1 | 1/2016 | Kim et al. |
| 2016/0050002 | A1 | 2/2016 | Wei et al. |
| 2016/0072564 | A1 * | 3/2016 | Li .......................... H04L 5/0025 370/329 |
| 2016/0099763 | A1 | 4/2016 | Chen |
| 2016/0119846 | A1 | 4/2016 | Chou et al. |
| 2016/0127997 | A1 | 5/2016 | Ang et al. |
| 2016/0135213 | A1 | 5/2016 | Zhu et al. |
| 2016/0157267 | A1 | 6/2016 | Mattias et al. |
| 2016/0191132 | A1 * | 6/2016 | Rajagopal .............. H04B 7/088 370/329 |
| 2016/0205679 | A1 | 7/2016 | Yoo et al. |
| 2016/0226640 | A1 | 8/2016 | Seol et al. |
| 2016/0234736 | A1 | 8/2016 | Kubota et al. |
| 2016/0242159 | A1 | 8/2016 | Ho et al. |
| 2016/0270027 | A1 | 9/2016 | Ang et al. |
| 2016/0277225 | A1 | 9/2016 | Frenne et al. |
| 2016/0286524 | A1 | 9/2016 | Griot et al. |
| 2016/0294531 | A1 * | 10/2016 | Loehr ............... H04W 72/0413 |
| 2016/0345189 | A1 | 11/2016 | Miyagawa et al. |
| 2016/0345234 | A1 | 11/2016 | Yang et al. |
| 2016/0353424 | A1 | 12/2016 | Stirling-Gllacher et al. |
| 2016/0379163 | A1 | 12/2016 | Johanson et al. |
| 2017/0026293 | A1 * | 1/2017 | Desclos ................ H04W 36/22 |
| 2017/0026962 | A1 | 1/2017 | Liu et al. |
| 2017/0034812 | A1 | 2/2017 | Deng et al. |
| 2017/0104561 | A1 | 4/2017 | Agardh et al. |
| 2017/0134913 | A1 | 5/2017 | Cui et al. |
| 2017/0142592 | A1 | 5/2017 | Fischer et al. |
| 2017/0149480 | A1 | 5/2017 | Kakishima et al. |
| 2017/0180095 | A1 | 6/2017 | Xue et al. |
| 2017/0195031 | A1 | 7/2017 | Onggonsanusi et al. |
| 2017/0201982 | A1 | 7/2017 | Alvarino et al. |
| 2017/0208589 | A1 | 7/2017 | Majjigi et al. |
| 2017/0223744 | A1 | 8/2017 | Qian et al. |
| 2017/0237783 | A1 | 8/2017 | Yang et al. |
| 2017/0244523 | A1 | 8/2017 | Yang et al. |
| 2017/0257842 | A1 | 9/2017 | Hessler et al. |
| 2017/0264350 | A1 * | 9/2017 | Sanderovich .......... H04B 7/088 |
| 2017/0295578 | A1 | 10/2017 | Khoshnevisan et al. |
| 2017/0310417 | A1 | 10/2017 | Jung et al. |
| 2017/0311285 | A1 | 10/2017 | Ly et al. |
| 2017/0331577 | A1 | 11/2017 | Parkvall et al. |
| 2017/0331670 | A1 | 11/2017 | Parkvall et al. |
| 2017/0347334 | A1 | 11/2017 | Akkarakaran et al. |
| 2017/0367046 | A1 * | 12/2017 | Papasakellariou ........................... H04W 52/0216 |
| 2017/0367069 | A1 | 12/2017 | Agiwal et al. |
| 2017/0374579 | A1 | 12/2017 | Wang et al. |
| 2018/0014251 | A1 | 1/2018 | Sambhwani et al. |
| 2018/0020462 | A1 | 1/2018 | Xiong et al. |
| 2018/0027419 | A1 | 1/2018 | Xu |
| 2018/0049177 | A1 | 2/2018 | Islam et al. |
| 2018/0070282 | A1 | 3/2018 | Su et al. |
| 2018/0077612 | A1 | 3/2018 | Zheng et al. |

(56) References Cited

U.S. PATENT DOCUMENTS

| | | |
|---|---|---|
| 2018/0077734 A1 | 3/2018 | Kim et al. |
| 2018/0103426 A1 | 4/2018 | Nacer et al. |
| 2018/0109353 A1* | 4/2018 | Kwak .................. H04L 1/0038 |
| 2018/0110066 A1 | 4/2018 | Luo et al. |
| 2018/0124612 A1 | 5/2018 | Babaei et al. |
| 2018/0139014 A1 | 5/2018 | Xiong et al. |
| 2018/0139615 A1 | 5/2018 | Cui et al. |
| 2018/0139701 A1 | 5/2018 | Wang et al. |
| 2018/0145732 A1* | 5/2018 | Shen .................... H04B 7/0623 |
| 2018/0176955 A1 | 6/2018 | Salem et al. |
| 2018/0184422 A1 | 6/2018 | Cavalcanti et al. |
| 2018/0191415 A1* | 7/2018 | Aryafar ................ H04B 7/0617 |
| 2018/0199306 A1 | 7/2018 | Stephen et al. |
| 2018/0205522 A1 | 7/2018 | Wang et al. |
| 2018/0206217 A1 | 7/2018 | Martin et al. |
| 2018/0206268 A1* | 7/2018 | Abdallah .............. H04W 74/08 |
| 2018/0213529 A1* | 7/2018 | Lee ....................... H04L 5/1469 |
| 2018/0227902 A1 | 8/2018 | Gholmieh et al. |
| 2018/0227960 A1 | 8/2018 | Belghoul et al. |
| 2018/0242160 A1 | 8/2018 | Morita et al. |
| 2018/0279303 A1 | 9/2018 | Sun et al. |
| 2018/0279324 A1 | 9/2018 | Wang et al. |
| 2018/0295552 A1 | 10/2018 | Chakraborty et al. |
| 2018/0332605 A1 | 11/2018 | Pelletier |
| 2018/0343043 A1* | 11/2018 | Hakola ................. H04B 7/0417 |
| 2018/0367230 A1 | 12/2018 | Su et al. |
| 2019/0007844 A1* | 1/2019 | Muller ................. H04B 7/0617 |
| 2019/0007963 A1 | 1/2019 | Akkarakaran et al. |
| 2019/0029005 A1 | 1/2019 | Bendlin et al. |
| 2019/0037495 A1* | 1/2019 | John Wilson ....... H04W 56/001 |
| 2019/0037560 A1 | 1/2019 | Huang et al. |
| 2019/0037586 A1* | 1/2019 | Park ...................... H04L 1/0057 |
| 2019/0052419 A1 | 2/2019 | Yang et al. |
| 2019/0058516 A1* | 2/2019 | Yang .................. H04W 72/0446 |
| 2019/0069321 A1* | 2/2019 | Akkarakaran ........ H04L 1/1664 |
| 2019/0089436 A1 | 3/2019 | Wei et al. |
| 2019/0089443 A1 | 3/2019 | Malik et al. |
| 2019/0089506 A1* | 3/2019 | Takeda .................. H04W 72/04 |
| 2019/0123798 A1* | 4/2019 | Lou ...................... H04B 7/0456 |
| 2019/0124664 A1 | 4/2019 | Wang |
| 2019/0132830 A1 | 5/2019 | Tabet et al. |
| 2019/0141767 A1 | 5/2019 | Wang et al. |
| 2019/0159140 A1 | 5/2019 | Wang et al. |
| 2019/0173626 A1 | 6/2019 | Wang et al. |
| 2019/0174433 A1 | 6/2019 | Nory et al. |
| 2019/0174497 A1 | 6/2019 | Wang et al. |
| 2019/0182850 A1 | 6/2019 | Wang et al. |
| 2019/0190577 A1 | 6/2019 | Wang et al. |
| 2019/0190591 A1 | 6/2019 | Wang et al. |
| 2019/0190641 A1 | 6/2019 | Wang et al. |
| 2019/0190676 A1 | 6/2019 | Wang et al. |
| 2019/0200322 A1 | 6/2019 | Wang et al. |
| 2019/0229789 A1* | 7/2019 | Zhang ................... H04B 7/0617 |
| 2019/0230603 A1 | 7/2019 | Liu et al. |
| 2019/0230607 A1 | 7/2019 | Chung et al. |
| 2019/0239168 A1 | 8/2019 | Li et al. |
| 2019/0261281 A1 | 8/2019 | Jung et al. |
| 2019/0261380 A1* | 8/2019 | Iyer ...................... H04B 7/0695 |
| 2019/0288809 A1* | 9/2019 | Iyer ...................... H04L 1/1893 |
| 2019/0289476 A1 | 9/2019 | Chen et al. |
| 2019/0305835 A1 | 10/2019 | Wang et al. |
| 2019/0306830 A1 | 10/2019 | Wang et al. |
| 2019/0342825 A1 | 11/2019 | Liu |
| 2019/0349968 A1* | 11/2019 | Yerramalli ........ H04W 72/1268 |
| 2019/0356368 A1* | 11/2019 | Liu ...................... H04L 5/0048 |
| 2019/0373557 A1 | 12/2019 | Agardh et al. |
| 2019/0380140 A1 | 12/2019 | Wong et al. |
| 2020/0028745 A1 | 1/2020 | Parkvall et al. |
| 2020/0052782 A1 | 2/2020 | Wang et al. |
| 2020/0275424 A1 | 8/2020 | Wang et al. |
| 2020/0374050 A1 | 11/2020 | Wang et al. |
| 2020/0403658 A1 | 12/2020 | Wang et al. |
| 2021/0021322 A1 | 1/2021 | Kuo et al. |
| 2021/0204292 A1 | 7/2021 | Wang |

FOREIGN PATENT DOCUMENTS

| | | |
|---|---|---|
| CN | 106664127 | 5/2017 |
| EP | 3081041 | 10/2016 |
| EP | 3105958 | 12/2016 |
| EP | 3123802 | 2/2017 |
| EP | 3443704 | 2/2019 |
| JP | 2018521521 | 8/2018 |
| KR | 20080062482 | 7/2008 |
| KR | 100860050 | 9/2008 |
| KR | 20160089702 | 7/2016 |
| KR | 20160109921 | 9/2016 |
| WO | 2013070149 | 5/2013 |
| WO | 2013179095 | 12/2013 |
| WO | 2015086215 | 6/2015 |
| WO | 2012074878 | 7/2015 |
| WO | 2016119882 | 8/2016 |
| WO | 2016133106 | 8/2016 |
| WO | 2016184277 | 11/2016 |
| WO | 2016204811 | 12/2016 |
| WO | 2017011802 | 1/2017 |
| WO | 2017025366 | 2/2017 |
| WO | 2017030601 | 2/2017 |
| WO | 2017083514 | 5/2017 |
| WO | 2017088898 | 6/2017 |
| WO | 2017109549 | 6/2017 |
| WO | 2017111987 | 6/2017 |
| WO | 2017117340 | 7/2017 |
| WO | 2017127126 | 7/2017 |
| WO | 2017146773 | 8/2017 |
| WO | 2017150863 | 9/2017 |
| WO | 2017195463 | 11/2017 |
| WO | 2017196057 | 11/2017 |
| WO | 2017196243 | 11/2017 |
| WO | 2018028579 | 2/2018 |
| WO | 2018031846 | 2/2018 |
| WO | 2018034998 | 2/2018 |
| WO | 2018064068 | 4/2018 |
| WO | 2018083253 | 5/2018 |
| WO | 2018084757 | 5/2018 |
| WO | 2018130115 | 7/2018 |
| WO | 2019078938 | 4/2019 |
| WO | 2019094078 | 5/2019 |
| WO | 2019112648 | 6/2019 |
| WO | 2019118020 | 6/2019 |
| WO | 2019118021 | 6/2019 |
| WO | 2019118023 | 6/2019 |
| WO | 2019118787 | 6/2019 |
| WO | 2019118915 | 6/2019 |
| WO | 2019126791 | 6/2019 |
| WO | 2019190638 | 10/2019 |
| WO | 2019193768 | 10/2019 |
| WO | 2020055602 | 3/2020 |

OTHER PUBLICATIONS

"First Action Interview Office Action", U.S. Appl. No. 15/842,318, dated May 7, 2019, 3 pages.

"International Search Report and Written Opinion", PCT Application No. PCT/US2018/067367, dated Mar. 20, 2019, 19 pages.

"Invitation to Pay Additional Fees", PCT Application No. PCT/US2018/065557, dated Mar. 13, 2019, 19 pages.

"Invitation to Pay Additional Fees", PCT Application No. PCT/US2018/065829, dated Mar. 15, 2019, 13 pages.

"Non-Final Office Action", U.S. Appl. No. 15/832,395, dated Feb. 27, 2019, 18 pages.

"Non-Final Office Action", U.S. Appl. No. 15/842,241, dated Mar. 11, 2019, 12 pages.

"Notice of Allowance", U.S. Appl. No. 15/852,572, dated Mar. 11, 2019, 5 pages.

"Pre-Interview Communication", U.S. Appl. No. 15/842,318, dated Mar. 29, 2019, 4 pages.

"Pre-Interview Communication", U.S. Appl. No. 15/833,312, dated Apr. 19, 2019, 4 pages.

"3rd Generation Partnership Project", Technical Specification Group Radio Access Network; NR and NG-RAN Overall; 3GPP Standard;

(56) References Cited

OTHER PUBLICATIONS

Technical Specification; 3GPP TS 38.300, 3rd Generation Partnership Project (3GPP), Mobile Competence Centre, Nov. 17, 2017, 56 pages.
"3rd Generation Partnership Project; Technical Specification Group Radio Access Network", Evolved Universal Terrestrial Radio Access (E-UTRA) and NR; Multi-connectivity; Stage 2 (Release 15); 3GPP Standard; Technical Specification; 3GPP TS 37.340, 3rd Generation Partnership Project (3GPP), Mobile Competence Centre, Nov. 17, 2017, 49 pages.
"International Search Report and Written Opinion", PCT Application No. PCT/US2018/041696, dated Oct. 9, 2018, 30 pages.
"International Search Report and Written Opinion", PCT Application No. PCT/US2018/046004, dated Nov. 22, 2018, 13 pages.
"Invitation to Pay Additional Fees", PCT Application No. PCT/US2018/049403, dated Nov. 19, 2018, 13 pages.
"Non-Final Office Action", U.S. Appl. No. 15/852,572, dated Sep. 14, 2018, 6 pages.
"Restriction Requirement", U.S. Appl. No. 15/842,318, dated Oct. 4, 2018, 7 pages.
Gineste, et al., "Narrowband IoT Service Provision to 5G User Equipment Via a Satellite Component", 2017 IEEE GLOBECOM Workshops, IEEE, Dec. 4, 2017, Dec. 4, 2017, 4 pages.
Thales, et al., "FS_5GSAT, Draft Use Case, Internet of Things with a Satellite Component", 3GPP TSG-SA WG1 Meeting #80, S1-174441, Reno, Nevada, USA, Nov. 27-Dec. 1, 2017, 2 pages.
"Restriction Requirement", U.S. Appl. No. 15/852,572, dated Jun. 11, 2018, 9 pages.
Pederson, et al., "A Flexible Frame Structure for 5G Wide Area", Aalborg University, Proceedings of IEEE VTC Fall-2015, 2015, 6 pages.
"International Search Report and Written Opinion", PCT Application No. PCT/US2018/049403, dated Jan. 16, 2019, 21 pages.
"International Search Report and Written Opinion", PCT Application No. PCT/2018/050487, dated Nov. 26, 2018, 13 pages.
"International Search Report and Written Opinion", PCT Application No. PCT/US2018/049407, dated Dec. 14, 2018, 18 pages.
"Dragonfly Narrowband IoT Unveiled with GNSS Option", GPS World Staff; Retrieved from http://gpsworld.com/dragonfly-narrowband-iot-unveiled-with-gnss-option/ on Dec. 7, 2017, Mar. 7, 2017, 5 pages.
"Leading the LTE IoT Evolution to Connect the Massive Internet of Things", Qualcomm, Inc., Jun. 2017, 41 pages.
"NB-IOT, Accelerating Cellular IOT", Huawei; Roads to MBB 2020; Building a Better Connected World; Global Mobile Broadband Forum 2015; Hong Kong, Nov. 2-5, 2015, 4 pages.
Dutta, et al., "Frame Structure Design and Analysis for Millimeter Wave Cellular Systems", avix.org; NYU Wireless, New York University Tandon School of Engineering, Aug. 20, 2016, 31 pages.
Jantti, "Machine Type Communications for Internet of Things—Recent advances and future possibilities", WNCG; Seminar, Oct. 7, 2016, 1 page.
Landstrom, et al., "NB-IOT: A Sustainable Technology for Connecting Billions of Devices", Ericsson Technology Review; Standardizing Narrowband IoT, Apr. 22, 2016, 12 pages.
"Final Office Action", U.S. Appl. No. 15/842,318, dated Jul. 10, 2019, 15 Pages.
"International Search Report and Written Opinion", PCT Application No. PCT/US2018/065829, dated Jun. 18, 2019, 28 pages.
"International Search Report and Written Opinion", PCT Application No. PCT/US2018/065557, dated Jun. 21, 2019, 38 pages.
"Non-Final Office Action", U.S. Appl. No. 15/939,060, dated May 23, 2019, 15 pages.
"Notice of Allowance", U.S. Appl. No. 15/842,241, dated Aug. 15, 2019, 6 pages.
"Final Office Action", U.S. Appl. No. 15/833,312, dated Oct. 7, 2019, 15 Pages.
"Final Office Action", U.S. Appl. No. 15/939,060, dated Nov. 29, 2019, 17 pages.
"Non-Final Office Action", U.S. Appl. No. 15/832,395, dated Aug. 30, 2019, 20 Pages.
"Non-Final Office Action", U.S. Appl. No. 16/446,416, dated Oct. 18, 2019, 7 Pages.
"Notice of Allowance", U.S. Appl. No. 15/842,241, dated Dec. 5, 2019, 5 Pages.
"Written Opinion", PCT Application No. PCT/US2018/065557, dated Nov. 15, 2019, 4 pages.
"Written Opinion of the International Preliminary Examining Authority", PCT Application No. PCT/US2018/049407, dated Oct. 21, 2019, 8 pages.
"Written Opinion of the International Preliminary Examining Authority", PCT Application No. PCT/US2018/049403, dated Oct. 25, 2019, 8 pages.
"Written Opinion of the International Searching Authority", PCT Application No. PCT/US2018/046004, dated Oct. 21, 2019, 6 pages.
"First Action Interview Office Action", U.S. Appl. No. 16/142,952, dated Jan. 30, 2020, 6 Pages.
"International Preliminary Report on Patentability", PCT Application No. PCT/US2018/046004, dated Jan. 23, 2020, 21 pages.
"International Preliminary Report on Patentability", PCT Application No. PCT/US2018/049403, dated Mar. 13, 2020, 20 pages.
"Non-Final Office Action", U.S. Appl. No. 16/126,920, dated Jan. 29, 2020, 21 Pages.
"Notice of Allowance", U.S. Appl. No. 16/142,952, dated Feb. 28, 2020, 9 Pages.
"Pre-Interview Communication", U.S. Appl. No. 16/142,952, dated Dec. 20, 2019, 5 Pages.
"Written Opinion of the International Preliminary Examining Authority", PCT Application No. PCT/US2018/065557, dated Feb. 4, 2020, 13 pages.
"Final Office Action", U.S. Appl. No. 15/832,395, 23 Pages.
"International Preliminary Report on Patentability", PCT Application No. PCT/US2018/067367, dated Mar. 17, 2020, 23 pages.
"Non-Final Office Action", U.S. Appl. No. 16/105,948, dated Mar. 27, 2020, 21 Pages.
Guidotti, et al., "LTE-Based Satellite Communications in LEO Mega-Constellations", 2017 John Wiley & Sons, Ltd., 2017, 17 pages.
O'Hara, et al., "Providing Narrowband IoT Coverage with Low Earth Orbit Satellites", 2019 Horizon House Publications, Inc., 2019, 4 pages.
"Non-Final Office Action", U.S. Appl. No. 15/833,312, dated Jun. 4, 2020, 17 Pages.
"Notice of Allowance", U.S. Appl. No. 16/126,920, dated Apr. 29, 2020, 8 Pages.
"Procedures Associated with Access and Operation of Uplink Common Packet Channel and the Associated Downlink Dedicated Control Channel", TSG-RAN WG 1#4 TSGR1#4(99) 371, Apr. 19-20, 1999, Yokohama, Japan, Apr. 1999, 10 pages.
"5G; Study on New Radio (NR) access technology (3GPP TR 38.912 version 14.0.0 Release 14)", ETSI TR 138 912 V14.0.0; May 2017, 77 pages.
"Final Office Action", U.S. Appl. No. 15/939,129, dated Jun. 11, 2020, 13 Pages.
"First Action Interview Office Action", U.S. Appl. No. 15/939,129, dated Sep. 16, 2019, 3 Pages.
"Foreign Office Action", European Application No. 18830637.7, dated Jul. 7, 2020, 7 pages.
"International Preliminary Report on Patentability", PCT Application No. PCT/US2018/043887, dated Jan. 22, 2020, 13 pages.
"International Preliminary Report on Patentability", PCT Application No. PCT/US2018/041696, dated Jun. 18, 2020, 14 pages.
"International Preliminary Report on Patentability", PCT Application No. PCT/US2019/017109, dated Jun. 23, 2020, 18 pages.
"International Preliminary Report on Patentability", PCT Application No. PCT/US2018/049407, dated Jun. 25, 2020, 12 pages.
"International Preliminary Report on Patentability", PCT Application No. PCT/US2018/065829, dated Jun. 25, 2020, 20 pages.
"International Preliminary Report on Patentability", PCT Application No. PCT/US2018/065557, dated Jun. 25, 2020, 29 pages.

(56) References Cited

OTHER PUBLICATIONS

"International Preliminary Report on Patentability", PCT Application No. PCT/US2018/050487, dated Jun. 25, 2020, 8 pages.
"International Search Report and Written Opinion", PCT Application No. PCT/US2018/043887, dated Nov. 6, 2018, 17 pages.
"International Search Report and Written Opinion", PCT Application No. PCT/US2018/043887, dated Nov. 6, 2018, 21 pages.
"International Search Report and Written Opinion", PCT Application No. PCT/US2019/048811, dated Dec. 4, 2019, 15 pages.
"International Search Report and Written Opinion", PCT Application No. PCT/US2019/017109, dated Mar. 28, 2019, 15 pages.
"Non-Final Office Action", U.S. Appl. No. 15/788,948, dated Nov. 29, 2018, 12 pages.
"Notice of Allowance", U.S. Appl. No. 15/788,948, dated Jul. 12, 2019, 8 Pages.
"Notice of Allowance", U.S. Appl. No. 15/788,948, dated Oct. 21, 2019, 8 Pages.
"Pre-Interview Communication", U.S. Appl. No. 15/939,129, dated Jun. 24, 2019, 3 pages.
"Progress on LAA and its Relationship to LTE-U and MulteFire", Qualcomm Presentation, Feb. 22, 2016, 33 pages.
"Tracking mm-Wave Channel Dynamics: Fast Beam Training Strategies Under Mobility", IMDEA Networks Institute, Madrid, Spain, Dec. 23, 2016, 11 pages.
"UE Overheating for EN-DC", 3GPP R2-1802414, UE overheating for EN-DC, in 3GPP TSG-RAN WG2 Meeting #101, Apple Inc., Mar. 2, 2018, 3 pages.
"Written Opinion of the International Preliminary Examining Authority", PCT Application No. PCT/US2018/043887, dated Sep. 30, 2019, 9 pages.
"Written Opinion of the IPEA", PCT Application No. PCT/US2019/017109, dated Mar. 2, 2020, 6 pages.
Wu, "Handling Overheating in a Wireless—Communication Device", Technical Disclosure Commons; Retrieved from https://www.tdcommons.org/dpubs_series/2343, Jul. 12, 2019, 22 pages.
Xiao, et al., "An Adaptive Channel Access Mechanism for LTE-U and WiFi Coexistence in an Unlicensed Spectrum", IEEE ICC 2016—Next-Generation Networking and Internet Symposium, 2016, 6 pages.
"Non-Final Office Action", U.S. Appl. No. 15/939,129, dated Oct. 29, 2020, 15 pages.
"Notice of Allowance", U.S. Appl. No. 16/105,948, dated Aug. 26, 2020, 10 Pages.
"Notice of Allowance", U.S. Appl. No. 15/833,312, dated Dec. 8, 2020, 14 pages.
"Corrected Notice of Allowability", U.S. Appl. No. 15/833,312, dated Jan. 7, 2021, 3 pages.
"Corrected Notice of Allowance", U.S. Appl. No. 15/833,312, dated Mar. 4, 2021, 3 pages.
"Corrected Notice of Allowance", U.S. Appl. No. 15/833,312, dated Mar. 30, 2021, 3 pages.
"Final Office Action", U.S. Appl. No. 15/939,129, dated Apr. 5, 2021, 17 pages.
"Foreign Office Action", KR Application No. 10-2020-7006868, dated Jan. 12, 2021, 8 pages.
"Foreign Office Action", EP Application No. 18833358.7, dated Mar. 18, 2021, 11 pages.
"Foreign Office Action", KR Application No. 10-2020-7019139, dated May 21, 2021, 13 pages.
"International Preliminary Report on Patentability", Application No. PCT/US2019/048811, dated Mar. 9, 2021, 8 page.
"Non-Final Office Action", U.S. Appl. No. 16/963,426, dated Apr. 1, 2021, 18 pages.
"Foreign Notice of Allowance", KR Application No. 10-2020-7006868, dated Jul. 22, 2021, 3 pages.
"Foreign Office Action", CN Application No. 201880063965.1, dated Jul. 1, 2021, 16 pages.
"Foreign Office Action", IN Application No. 202047026348, dated Aug. 13, 2021, 10 pages.
"Foreign Office Action", CN Application No. 201880070673.0, dated Aug. 27, 2021, 26 pages.
"FS_5GSAT, Draft Use Case, Internet of Things with a Satellite Component", 3GPP TSG-SA WG1 Meeting #80-S1-174570, Dec. 2017, 2 pages.
"Notice of Allowance", U.S. Appl. No. 15/939,129, dated Jul. 19, 2021, 7 pages.
"Foreign Office Action", KR Application No. 10-2021-7032586, dated Oct. 20, 2021, 8 pages.
"Notice of Allowance", U.S. Appl. No. 16/963,426, dated Oct. 5, 2021, 13 pages.
"Notice of Allowance", U.S. Appl. No. 15/939,129, dated Oct. 26, 2021, 9 pages.

\* cited by examiner

BEAMFORMING ENHANCEMENT VIA STRATEGIC RESOURCE UTILIZATION

BACKGROUND

Electronic devices play integral roles in manufacturing, healthcare, commerce, social interaction, entertainment, and communication. For example, most people consider their smart phone a critical part of their daily lives. Electronic devices also enable the computer server farms that provide cloud-based, distributed computing functionality for commerce and social interaction. Further, devices with computing power are embedded in many different types of modern equipment, from medical devices to household appliances and from vehicles to industrial tools. Thus, electronic devices are manufactured in a multitude of sizes, form factors, and capabilities for an even greater array of purposes. One particularly prominent purpose for electronic devices is communication, including communication over longer distances.

Prior to the development of electronic devices, long-distance communication was generally limited to the physical transport of a letter by a human being. Other options included sending up smoke signals or recruiting a pigeon to carry a short letter. The former option is limited to short distances and is subject to the whims of the weather, and the latter option has reliability issues that are self-evident. Fortunately, the invention of the telegraph ushered in the age of reliable long-distance communication using electrical signals that encoded the written word, e.g., using a Morse code for each letter. Eventually, telegraph technology was upgraded to telephone technology so that people could simply speak to one another using electrical signals that traversed great distances. Both telegraph and telephone technology, however, require a wire that is extended between both parties to a communication.

The next step in the evolution of communication involved harnessing electromagnetic (EM) waves that travel in free space without using a wire. However, EM waves generally travel in a straight line, so they could not easily cover great distances. One exception to this is shortwave EM signals. Shortwave EM signals still travel in straight lines, but they reflect off a layer of the earth's atmosphere called the ionosphere. Shortwave EM signals can therefore be reflected past the earth's horizon to enable communication across thousands of miles. Unfortunately, communicating with shortwave EM signals typically involves using antennas that are many tens of feet tall. These are expensive and impractical for mobile communication. To enable portability, citizen band (CB) radios and walkie-talkies were developed for mobile use. Even in the 1960s and 1970s, CB radios and walkie-talkies could be produced in a portable or even hand-held form. Unfortunately, communication with either of these portable devices was limited to just a few miles.

By the 1980s, communication using electrical or EM signals was generally divided into using fully-wired technology or fully-wireless technology, especially for consumers and other low-cost scenarios. For example, telephones enabled long-distance voice communication, but telephone technology was still generally limited to wired connections. Portable radios, on the other hand, used EM waves to establish wireless connections, but voice communications with these consumer-level devices used EM waves that were generally limited to no more than a few miles. To merge these two technologies and achieve some benefits of both, cellular technology was created. Cellular technology can be implemented using a communication network that combines both a wireless network and a wired network. As a result, cellular technology enables mobile electronic devices to be used to make long-distance communications.

With cellular technology, a communication between two people usually has both a wireless portion and a wired portion. A portion of a communication that is near one party is instituted using a wireless connection between a mobile phone and a base station, which is part of a cellular or wireless network of a communication network. This wireless connection typically extends from a few feet to a few miles. The communication network also includes or is coupled to a wired network. Thus, the base station continues the communication using a wired connection over the wired network. The wired network can extend from hundreds of feet to thousands of miles. If the other party is also using a mobile phone, the communication can be converted back to another wireless portion and routed to the other party using another wireless connection.

To enable cellular technology to work across a wide geographic region, many base stations are distributed to enable a wireless portion of a communication. Each of these base stations is typically able to support multiple users by simultaneously establishing multiple wireless connections with respective ones of multiple mobile phones. Thus, by the 1990s, cellular technology enabled voice calls to be made using a communication that included both a wireless connection and a wired connection. To expand the ability to communicate with more than voice using cellular technology, cellular systems were augmented to include an ability to communicate textually. Such communication used text messages, which were called short message service (SMS) messages. This launched a continuing endeavor to enable mobile phones and other electronic devices to send and receive data, as well as enable voice communications.

Communication of data, in addition to voice, became feasible with the development of Second Generation (2G) wireless networks. However, data communication was not meaningful for most purposes until Third Generation (3G) wireless networks were deployed. 3G wireless networks enabled mobile phone users to send and receive simple emails and access basic web pages without experiencing lengthy delays. However, Fourth Generation (4G) networks, such as those based on a Long-Term Evolution (LTE) standard, truly enabled the data-based wireless services that users enjoy today. For example, with a smart phone operating on a 4G network, a user can now make video calls in addition to voice calls. Additionally, users can surf the web without constraints and can receive real-time, turn-by-turn navigational directions. Further, users can stay up-to-date on social media postings, upload their own images or even videos, and watch high-definition video, all while on-the-go.

To accommodate these existing services, wireless networks are already expected to handle immense quantities of data with little to no appreciable delays. However, newer services are primed to demand even more from cellular wireless networks. Users will expect greater data bandwidth and even less delay, or latency, to accommodate such services. These new services include high-data-bandwidth applications like ultra-high definition (UHD) video that is delivered wirelessly from some streaming video service. Such services also include low-latency applications like autonomous-driving vehicles that communicate with each other and can therefore operate more safely if provided nearly instantaneous data communication capabilities. Some applications, like virtual reality (VR), will demand data delivery that offers both high-bandwidth and low-latency. Further, there is the ongoing development of the Internet of Things (IoT), which involves providing wireless communication capabilities to everything from medical devices to security hardware and from refrigerators to speakers. The deployment of IoT devices means hundreds of billions to trillions of new devices will soon be trying to communicate wirelessly.

Current 4G wireless networks are not expected to be able to handle the data bandwidth and latency specifications for these new applications. Accordingly, to enjoy these new applications, new wireless technology is being developed. This Fifth Generation (5G) wireless network technology will adopt higher frequency EM waves (e.g., 6 GHz to 100 GHz for millimeter wave (mmW) wireless connections) to attain higher data bandwidth in conjunction with lower latency. These new applications and higher EM frequencies, however, introduce new and different challenges that are yet to be overcome.

For example, with the multitude of IoT devices that are coming on-line, the EM spectrum that is allocated to cellular wireless usage will be shared among many more wireless connection endpoints. Also, with the mmW EM signaling that will be used in 5G cellular networks, wireless signals are attenuated more quickly by air molecules and environmental factors, such as humidity or physical obstructions, as compared to those signaling frequencies used in earlier generations of wireless networks. Consequently, mmW EM signals are incapable of traveling as far through the atmosphere before a quality thereof is reduced to a level at which the information in the wireless signal is lost. To address these issues, engineers and manufacturers are striving to create new wireless signaling technologies that can enable utilization of these GHz frequencies in a cellular wireless network, including those operating in accordance with a 5G wireless network standard.

This background description is provided to generally present the context of the disclosure. Unless otherwise indicated herein, material described in this section is neither expressly nor impliedly admitted to be prior art to the present disclosure or the appended claims.

SUMMARY

Techniques and apparatuses are described for beamforming enhancement via strategic resource utilization. These techniques and apparatuses enable wireless communications to be made using antenna beamforming with more spectral and power efficiency and with less delay. A beamforming enhancement module causes an air interface resource—which includes a slice of frequency spectrum over time—to be allocated so as to provide opportunities to train a beamformer. In some implementations, end-user devices are classified into different beamforming states. The end-user devices are then allocated communication resource units based on the beamforming state to which each is classified. In other implementations, communication resource units are allocated from the air interface resource based on one or more resource allocation rules. The rules provide, for example, opportunities to train a beamformer on a downlink communication prior to engaging in an uplink communication, and vice versa. In still other implementations, the resource allocation rules are applied based on a classified beamforming state.

Aspects described below include a method for enhancing beamforming in a wireless system. The method comprises monitoring communications with multiple end-user devices and determining, based on the monitoring, a respective activity level for each end-user device of the multiple end-user devices. The method also comprises classifying each end-user device of the multiple end-user devices into a beamforming state of multiple beamforming states based on the respective determined activity level of each end-user device. The method additionally comprises allocating resource units from an air interface resource to each end-user device of at least a portion of the multiple end-user devices based on the beamforming state to which each end-user device is classified. The method further comprises transmitting indications of the allocated resource units to the portion of the multiple end-user devices.

Aspects described below include an apparatus for enhancing beamforming in a wireless system. The apparatus comprises a communication unit including multiple antennas and at least one hardware-based processor. The apparatus also comprises one or more computer-readable storage media including a beamforming enhancement module configured to be executed by the at least one hardware-based processor to generate signal beams using the multiple antennas in accordance with an air interface signaling protocol. The air interface signaling protocol includes a classification of multiple end-user devices into at least one beamforming state of multiple beamforming states. The air interface signaling protocol also includes an allocation of resource units of an air interface resource based on the classification and one or more resource allocation rules that provide repeated opportunities for beamforming training between the multiple end user devices and an associated base station.

Aspects described below also include an electronic device for enhancing beamforming in a wireless system. The electronic device comprises one or more processors and one or more computer-readable storage media storing modules that are executable by the one or more processors. The computer-readable storage media includes one or more resource allocation rules and an activity level determination module configured to determine a respective activity level of each end-user device of multiple end-user devices. The computer-readable storage media also includes a beamforming state classification module and a resource allocation module. The beamforming state classification module is configured to classify each end-user device of the multiple end-user devices into a beamforming state of multiple beamforming states based on the respective determined activity level of each end-user device. The resource allocation module is configured to allocate resource units from an air interface resource to each end-user device of at least a portion of the multiple end user devices based on the one or more resource allocation rules and the beamforming state to which each end-user device is classified.

Aspects described below also include a system for beamforming enhancement via strategic resource utilization. The system comprises one or more resource allocation rules and an activity level determination module configured to determine a respective activity level of each end-user device of multiple end-user devices. The system also comprises beamforming state classification means for classifying each end-user device of the multiple end-user devices into a beamforming state of multiple beamforming states based on the respective determined activity level of each end-user device. The system further comprises resource allocation means for allocating resource units from an air interface resource to each end-user device of at least a portion of the multiple end-user devices based on the one or more resource allocation rules and the beamforming state to which each end-user device is classified.

BRIEF DESCRIPTION OF THE DRAWINGS

Apparatuses of and techniques for implementing beamforming enhancement via strategic resource utilization are described with reference to the following drawings. The same numbers are used throughout the drawings to reference like features and components.

DETAILED DESCRIPTION

Overview

Figure 1:
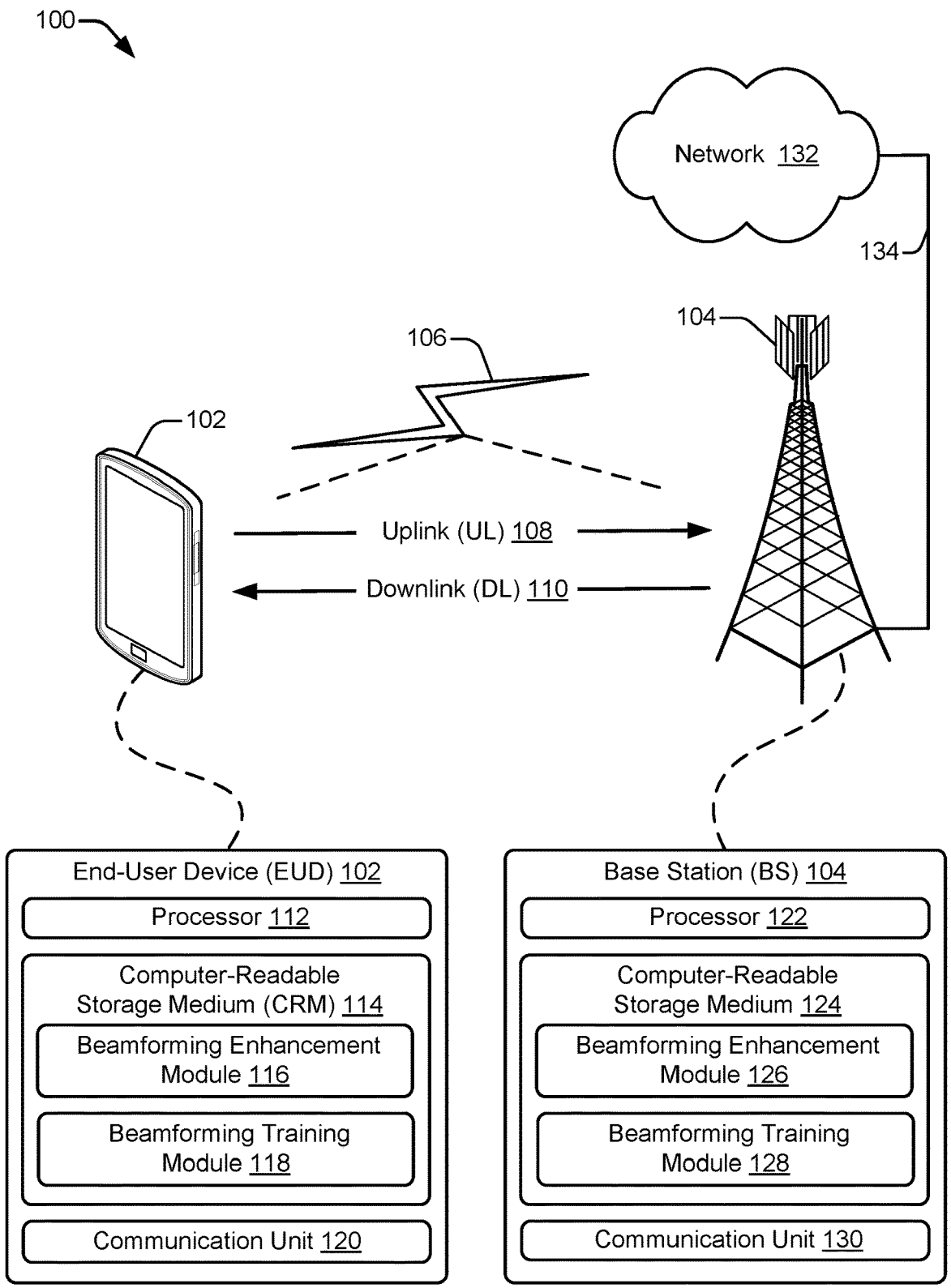
FIG. 1 illustrates an example environment, including an end-user device and a base station, in which beamforming enhancement via strategic resource utilization can be implemented.

The ability to enjoy different types of digital content, services, and other applications over a wireless connection continues to change for the better. Today, users can watch HD video, monitor social network feeds, and participate in video conferences using cellular wireless networks that operate in accordance with a 4G standard, such as LTE or LTE-Advanced. In the near future, cellular wireless networks will be asked to handle newer applications that are technically more difficult. Such applications may include watching ultra-HD (UHD) video or wirelessly coupling hundreds of billions more communication endpoints to the internet to support IoT devices. Such applications may also include providing a safer sharing of the roadways by self-driving vehicles or an exchanging of three-dimensional (3D) VR data for games and educational activities. To enable these newer applications, current cellular wireless networks are expected to be upgraded from 4G.

To upgrade from current 4G wireless networks, a destination goal has been established for next-generation 5G networks. This destination goal involves adopting higher EM frequencies for signaling in 5G networks than are used in 4G networks. For example, instead of operating in the 100s of MHz to a few GHz like in 4G networks, 5G networks are expected to operate in the 10s of GHz (e.g., from 6 GHz to 100 GHz for mmW signaling). These higher frequencies offer some advantages, such as the potential for greater communication bandwidth in conjunction with lower latency. However, there are many challenges to working with these higher frequencies, and some of these challenges have yet to be surmounted by the telecommunications industry. In other words, although this high-frequency destination or goal is established for 5G networks, the path to reach this high-frequency destination for an efficient, feasible 5G wireless network has not yet been discovered.

Several examples of the existing challenges for attaining a workable, high-frequency wireless 5G network are set forth here. For example, with the frequencies to be used for mmW signaling for 5G wireless networks, signal strength rapidly attenuates, or reduces, as an EM signal travels through the earth's atmosphere, especially in wet weather. Consequently, the potential distance between a transmitter and a receiver is reduced for mmW signals. As another example, at some of these higher frequencies, emanation of EM signals in proximity to, and in a direction of, skin is to be avoided for extended periods. Beamforming, however, can address both these issues.

With beamforming, a signal is emanated from an antenna array in a particular direction or in a particular pattern instead of equally in all directions from a single antenna. This enables the resulting signal beam to be directed away from skin to accommodate any relevant specific absorption rate (SAR) guidelines instituted for health reasons. Moreover, the emanated power can be concentrated in a specific direction that extends from a transmitter in a direction toward a receiver. Consequently, a signal that is transmitted at a given power level can travel farther through the air, even at the higher frequencies that attenuate more quickly in the earth's atmosphere.

Antenna beamforming offers another advantage: an increased or more-efficient sharing of the EM spectrum. By concentrating a signal in one direction from a first transmitter to a first receiver, the signal is less likely to cause interference in other directions. As a result, a signal on the same frequency can be reused by a second transmitter and a second receiver in a spatial area that is close to that of the first transmitter and receiver. This spatially-based frequency-reuse technique enables more devices to communicate wirelessly in a given geographic region using a designated frequency range.

Thus, antenna beamforming can offer a number of advantages, including some that pertain especially to wireless communication with the mmW signals that are earmarked for 5G wireless networks. However, wireless communication with beamforming is more complicated than wireless communication without it. Without antenna beamforming, a transmitter merely emanates an EM signal omnidirectionally. With antenna beamforming, on the other hand, a transmitter has to determine a direction at which to aim a beam of a signal. The determination of an appropriate direction is called training the antenna beamforming. This training can be accomplished in different manners, but each manner occupies some period of time and consumes some amount of resources at the transmitting device and/or at the receiving device. If the time period is too long, the antenna beamforming can produce a signal latency that slows a communication. Further, while a transmitting or a receiving device is training the beamforming, the device's processor and RF resources, as well as power resources, are being consumed. This resource consumption can, for example, shorten battery life at a mobile phone or limit how many mobile phones a base station can service at any given time.

To ameliorate the potential impacts of antenna beamforming on a wireless communication system, implementations that are described herein facilitate training for antenna beamforming by orchestrating a communication exchange between a base station and a user equipment (UE) (e.g., a mobile phone, a security sensor, or a vehicle). The communication exchange enables at least some beamforming training to be performed before a scheduled uplink (UL) or downlink (DL) communication is to occur. This beamforming training at least partially prepares a beamforming apparatus by predetermining beamforming parameters. Further, the communication exchange is orchestrated to efficiently enable beamforming training while reducing an impact of the training on communication latency and/or resource utilization, including reducing impacts on power consumption, communication unit utilization, and EM spectrum usage.

To do so, an electronic device of a base station or a UE performs one or more actions in accordance with at least one resource allocation rule that facilitates beamforming training. For example, control-related communications and data-related communications between any two pairs of electronic devices are assigned to a same one or more frequency tones in accordance with a resource allocation rule. Thus, training for data communications can be performed while engaging in control communications, and vice versa. Additionally, UEs can be classified into two or more different beamforming states based on activity level—e.g., in accordance with at least one beamforming training rule.

In some implementations, UEs are classified into three beamforming states: an active beamforming state, an idle beamforming state, and an inactive beamforming state. In the active beamforming state, UL and/or DL traffic is ongoing. Thus, air interface resource units for transmitting control and data between a base station and a UE can be scheduled to occur on the same frequency tones. Also, each UL allocation can be preceded by a DL allocation to facilitate training for the UL allocation. The preceding DL allocation may be explicit or implicit. Similarly, each DL allocation can be preceded by an UL allocation to facilitate training for the DL allocation. The preceding UL allocation may be explicit or implicit. Further, each UL and DL allocation can be made to be periodic to ensure that beamforming information is recent. In this context, "periodic" means that a resource allocation rule ensures that consecutive wireless communications are caused to occur within some maximum period based on at least one temporal threshold. The temporal threshold can vary based on a beamforming state classification.

In the idle beamforming state, UL and DL traffic are not currently ongoing. Nevertheless, when traffic does occur, control and data communication can be scheduled on the same frequency tones in accordance with a resource allocation rule. Also, resource allocations in one direction can be preceded by an allocation in the other direction to facilitate training in accordance with another resource allocation rule. Further, resource allocations for wireless communications can be made periodically to ensure that beamforming information is recent. However, a maximum period between consecutive wireless communications in the idle beamforming state is configured to be longer than a maximum period between consecutive wireless communications in the active beamforming state. In the inactive beamforming state, a recent UL or DL transmission has not been carried out. Consequently, neither the base station nor the UE typically has recent beamforming information for this inactive state. In accordance with example resource allocation rules for beamforming training, no UL/DL communication pairs are exchanged merely to keep beamforming parameters current for the inactive beamforming state.

Thus, using these implementations, antenna beamforming can be implemented in a wireless network system while reducing latency and lowering the impact on resources that beamforming training can otherwise cause. Other techniques that are described herein can also be implemented to facilitate beamforming training. For example, a sounding reference signal (SRS) can be beamformed on an UL by a UE based on a DL broadband cell-specific reference signal (CRS) or a Channel State Information Reference Signal (CSI-RS). Also, a null downlink control information (DCI) signal can be transmitted by a base station if, e.g., no other DL traffic is scheduled for a given block of frequency and time. In alternative implementations, control beamforming can be allocated independently so that UEs with no active data traffic can still maintain beamforming information.

Example implementations in various levels of detail are discussed below with reference to the associated figures. The discussion below first sets forth an example operating environment and then describes example schemes, techniques, and hardware. Example methods are described next with reference to various flow diagrams, and the discussion then concludes with an example electronic device and aspects related thereto.

Example Environment

FIG. 1 illustrates an example operating environment 100 in which an electronic device can realize an implementation of beamforming enhancement via strategic resource utilization. In this example, the operating environment 100 includes an end-user device 102 (EUD) and a base station 104 (BS) that are respectively configured to communicate over a wireless link 106 of a wireless network. Generally, the wireless link 106 can include an uplink 108 by which the end-user device 102 transmits data or control information to the base station 104 and a downlink 110 by which the base station 104 transmits data or control information to the end-user device 102. The wireless link 106 may be implemented in accordance with at least one suitable protocol or standard, such as a Global System for Mobile Communications (GSM) standard, a Worldwide Interoperability for Microwave Access (WiMAX) standard, a High Speed Packet Access (HSPA) protocol, an Evolved HSPA (HSPA+) protocol, a Long-Term Evolution (LTE) standard (e.g., 4G), an LTE Advanced (LTE-A) standard, a Fifth Generation wireless network (5G) standard, any standard promulgated or supported by the 3rd Generation Partnership Project (3GPP), and so forth. Although the wireless link 106 is shown or described with reference to a separate uplink 108 or downlink 110, various types of communications between the end-user device 102 and the base station 104 may also be referred to as a wireless communication, a wireless connection, a wireless association, a frame exchange, a communication link, or the like.

In example implementations, the end-user device 102 includes at least one processor 112, one or more computer-readable storage media 114, and at least one communication unit 120. The end-user device 102 is depicted as a smart phone. However, the end-user device 102 may instead be implemented as any device with wireless communication capabilities, such as a mobile gaming console, a tablet, a laptop, an Advanced Driver Assistance System (ADAS), a point-of-sale (POS) terminal, a health monitoring device, a drone, a vehicle, a camera, a media-streaming dongle, a wearable smart-device, an Internet-of-Things (IoT) device, a personal media device, a navigation device, a mobile-internet device (MID), a wireless hotspot, a femtocell, a broadband router, a mobile station, a user equipment (UE), or some combination thereof. The computer-readable storage media 114 can include a beamforming enhancement module 116 and a beamforming training module 118, which are described below.

The processor 112 of the end-user device 102 can execute processor-executable instructions or code stored by the computer-readable storage medium 114 (CRM) to cause the end-user device 102 to perform operations or implement various device functionalities. In some cases, the processor 112 is implemented as a general-purpose processor (e.g., a multicore central-processing unit (CPU)), an application-specific integrated circuit (ASIC), or a system-on-chip (SoC) with other components of the end-user device integrated therein. The CRM 114 may include any suitable type of memory media or storage media, such as read-only memory (ROM), programmable ROM (PROM), random access memory (RAM), dynamic RAM (DRAM), static RAM (SRAM), or Flash memory. In the context of this discussion, the CRM 114 of the end-user device 102 is implemented as at least one hardware-based storage medium, which does not include transitory signals or carrier waves. In some cases, the CRM 114 stores firmware, an operating system, and/or applications of the end-user device 102 as instructions, code, or other information. The instructions or code can be executed by the processor 112 to implement various functionalities of the end-user device 102, such as those related to beamforming, beamforming training, resource utilization, network access, and so forth. In this example, the CRM 114 stores processor-executable instructions or code to implement the beamforming enhancement module 116 or the beamforming training module 118 of the end-user device 102.

The communication unit 120 of the end-user device 102 can include an antenna, a receiver, a transmitter, a baseband processor, and associated circuitry or other components (not shown) for communicating with the base station 104 via a wireless signal propagation medium (e.g., the air). For example, the communication unit 120 may transmit, via the transmitter, data or control information to the base station 104 via the uplink 108. This data or control information that is transmitted to the base station 104 may include any suitable type of framed or packetized information, such as device status information, wireless link status information, wireless link control information, data requests, data, network access requests, indications of channel quality, and so forth. The communication unit 120 may also receive, via the receiver, data or control information from the base station 104, such as wireless link configuration settings, network control information, resource grants, data traffic, and so forth.

In FIG. 1, the base station 104 is depicted generally as a cellular base station of a wireless network (not separately indicated). Using a wireless network, the base station 104 may enable or provide access to other networks or resources, such as the network 132 (e.g., the Internet) that is connected via a wired network interface portion of a communication unit 130 and a backhaul link 134 (e.g., a fiber network). The base station 104 may be implemented to realize or manage at least one cell of a wireless network that includes multiple other base stations that each realize other respective cells of the wireless network. As such, the base station 104 may communicate with a network management entity or other base stations to coordinate connectivity or hand-offs of end-user devices within or across the cells of the wireless network. The base station 104 can be configured as any suitable type of base station or network management node, such as a Global System for Mobile Communications (GSM) base station, a node base (Node B) transceiver station (e.g., for UMTS), an evolved NodeB (eNB, e.g., for LTE), a next generation Node B (gNB, e.g., for 5G), and so forth. As such, the base station 104 may control or configure parameters of the uplink 108 or the downlink 110 in accordance with one or more of the wireless standards or protocols identified herein.

In example implementations, the base station 104 includes at least one processor 122, one or more computer-readable storage media 124, and at least one communication unit 130. The processor 122 can execute processor-executable instructions or code stored by the computer-readable storage medium 124 (CRM) to perform operations or implement various base station functionalities. In some cases, the processor 122 is implemented as multiple processor cores or a multicore processor configured to execute firmware or an operating system of the base station 104, as well as any applications thereof. The CRM 124 may include any suitable type of memory media or storage media, such as ROM, PROM, RAM, DRAM, SRAM, or Flash memory. In the context of this discussion, the CRM 124 is implemented as at least one hardware-based storage medium, which does not include transitory signals or carrier waves. The CRM 124 of the base station 104 may store firmware, an operating system, or applications of the base station as instructions, code, or other information. The instructions or code can be executed by the processor 122 to implement various functionalities of the base station 104, such as to manage connectivity or parameters of the wireless link 106 with the end-user device 102. In this example, the CRM 124 also stores processor-executable instructions or code for implementing the beamforming enhancement module 126 and the beamforming training module 128 of the base station 104.

In some aspects, a resource manager (not shown) of the base station 104 can be implemented to perform various functions associated with allocating physical access resource units (e.g., resource blocks or resource elements) or communication resources available to the base station 104. The physical access resources, such as an air interface resource available to the base station 104, may be partitioned or divided into various resource units (e.g., frames or blocks) of bandwidth, time spans, carriers or frequency bands, symbols, or the like. For example, within a framework of an LTE standard, the resource manager can allocate frequency spectrum and time intervals of access in resource blocks, each of which can be allocated in whole or in part, to one or more end-user devices communicating with the base station 104.

The resource manager can also communicate, to the end-user device 102, an identification of the allocated resource units for a communication via the uplink 108 or the downlink 110. The identification may include one or both of frequency bands or temporal locations of respective resource blocks or elements of the allocated resource units. The frequency bands or temporal locations may be effective to enable the end-user device 102 to communicate in a mode or manner as described herein via the allocated resource units. In such instances, each indication of the allocated resource units may be communicated from the base station 104 to the end-user device 102 as, e.g., part of a Radio Resource Control (RRC) message or a Downlink Control Information (DCI) message.

The communication unit 130 of the base station 104 can include an antenna, a receiver, a transmitter, a baseband processor, and associated circuitry or other components (not shown) for communicating with the end-user device 102 via the wireless signal propagation medium. In some cases, the communication unit 130 includes or is coupled with multiple transceivers and antenna arrays that are configured to establish and manage multiple wireless links with respective ones of multiple end-user devices (e.g., in accordance with a massive multiple-input and multiple-output (MIMO) implementation). The base station 104 may communicate any suitable data or control information to the end-user device 102 (or other devices) through the downlink 110, such as a schedule of allocated resource units, data traffic, wireless link status information, wireless link control information, and so forth.

Figure 2:
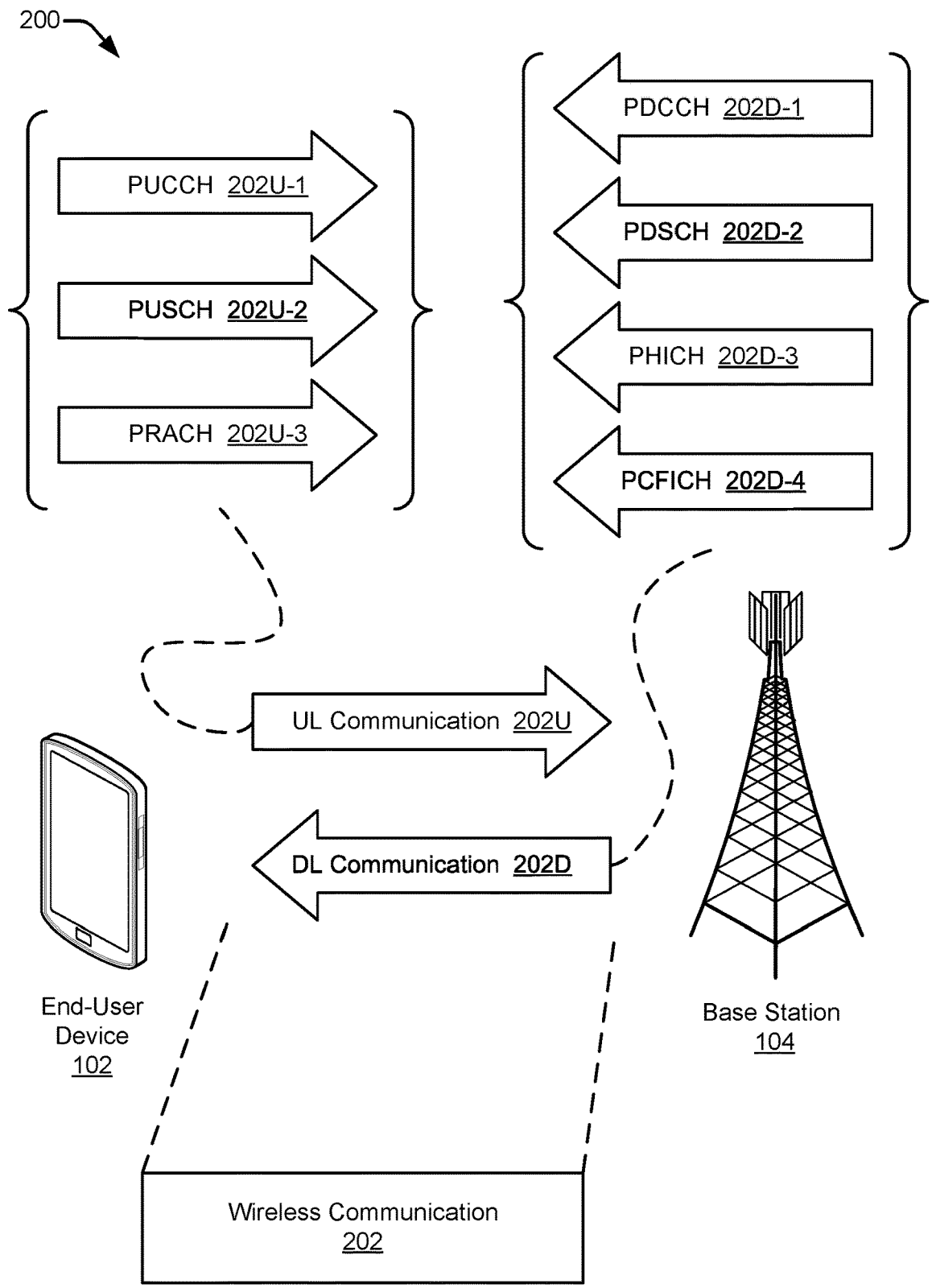
FIG. 2 illustrates other aspects of an example environment in which beamforming enhancement via strategic resource utilization can be implemented.

FIG. 2 illustrates an example wireless system 200 in which an end-user device 102 and a base station 104 may communicate in accordance with one or more aspects described herein. The wireless system 200 includes respective instances of the end-user device 102 and the base station 104. The base station 104 provides a portion of a wireless network with which the end-user device 102 may associate to enable a wireless communication 202 to be exchanged. The wireless system 200 may include other base stations, a network management entity, and so forth (not shown) to provide a wireless wide area network (WAN), such as an LTE network or a 5G network offering associated data services.

The end-user device 102 and/or the base station 104 may communicate through any suitable type or combination of channels, message exchanges, or network management procedures using at least one wireless communication 202. As shown, each communication 202 can include an UL communication 202U from the end-user device 102 to the base station 104 or a DL communication 202D from the base station 104 to the end-user device 102 (or both—e.g., a UL/DL pair). The UL communication 202U can include an uplink data channel and/or an uplink control channel, a few examples of which are depicted in the top left of FIG. 2. Similarly, the DL communication 202D can include a downlink data channel and/or a downlink control channel, a few examples of which are depicted in the top right. Alternatively, a wireless communication 202 can include both a DL communication 202D and an UL communication 202U. Further, the UL and DL communications of a wireless communication 202 can be related, such as by being exchanged between the same two electronic devices or by being adjacent to each other.

The wireless system 200 can be implemented to comport with any of one or more different wireless standards or protocols. Example implementations that may comport with an LTE standard are described with reference to FIG. 2. In this example, the end-user device 102 can transmit control information to the base station 104 via a physical uplink control channel 202U-1 (PUCCH). The PUCCH 202U-1 may be used to transmit, to the base station 104, one or more of hybrid automatic repeat request (HARQ) messages, acknowledge/not acknowledge (ACK/NACK) messages, channel quality indicators (CQI), multiple-input-multiple-output (MIMO) feedback such as a rank indicator (RI) or a precoding matrix indicator (PMI), and scheduling requests for an uplink data transmission. The end-user device 102 can transmit using, for instance, a binary phase-shift keying (BPSK) modulation or a quadrature phase-shift keying (QPSK) modulation for the PUCCH modulation.

The end-user device 102 may send data to the base station 104 via a physical uplink shared channel (PUSCH) 202U-2. The PUSCH 202U-2 can include radio resource control (RRC) communications, uplink control information (UCI) messages, application data, and so forth. The PUSCH 202U-2 is typically the channel on which the end-user device 102 transmits application data to the base station 104. Another example channel of an UL communication 202U is the physical random-access channel (PRACH) 202U-3. With the PRACH 202U-3, the end-user device 102 can make a non-synchronized transmission to the base station 104.

The base station 104 can transmit control information to the end-user device 102 via a physical downlink control channel (PDCCH) 202D-1. The PDCCH 202D-1 can be used by the base station 104 to communicate Downlink Control Information (DCI) and/or Radio Resource Control (RRC) information to the end-user device 102. In some scenarios, the DCI includes identification of resource units (e.g., resource blocks or resource elements) to be used for communication of data to the end-user device 102. The DCI may also include a modulation scheme and coding/decoding information for the end-user device 102 to access the data communicated to the end-user device 102.

The base station 104 may send data to the end-user device 102 via a physical downlink shared channel (PDSCH) 202D-2. Thus, the PDSCH 202D-2 is typically the channel on which the base station 104 transmits application data to the end-user device 102. Alternatively or additionally, the base station 104 may send information to the end-user device 102 via a physical HARQ indicator channel (PHICH) 202D-3. The PHICH 202D-3 can include acknowledgements (ACKs) or no-acknowledgements (NACKs) for data received from the end-user device 102 via the PUSCH 202U-2. Another example channel of a DL communication 202D is the physical control format indicator channel (PCFICH) 202D-4. With the PCFICH 202D-4, the base station 104 can inform the end-user device 102 of the format of a signal being received.

The terminology used with reference to FIG. 2 for example UL communications 202U and DL communications 202D relate at least to an LTE standard. However, as used herein, these particular channels and other standard-specific terms (e.g., sounding reference signal (SRS) or downlink control indicator (DCI)), the corresponding underlying concepts, and analogous technologies are not limited to wireless systems or devices that comport with a 4G standard. Instead, these terms may be used as a shorthand to refer to the underlying physical principles or analogous general wireless system technologies. Furthermore, implementations that are described herein can additionally or alternatively pertain to other wireless standards, specifications, and technologies, including other existing and future standards affiliated with the 3GPP (e.g., 5G NR).

Figure 3:
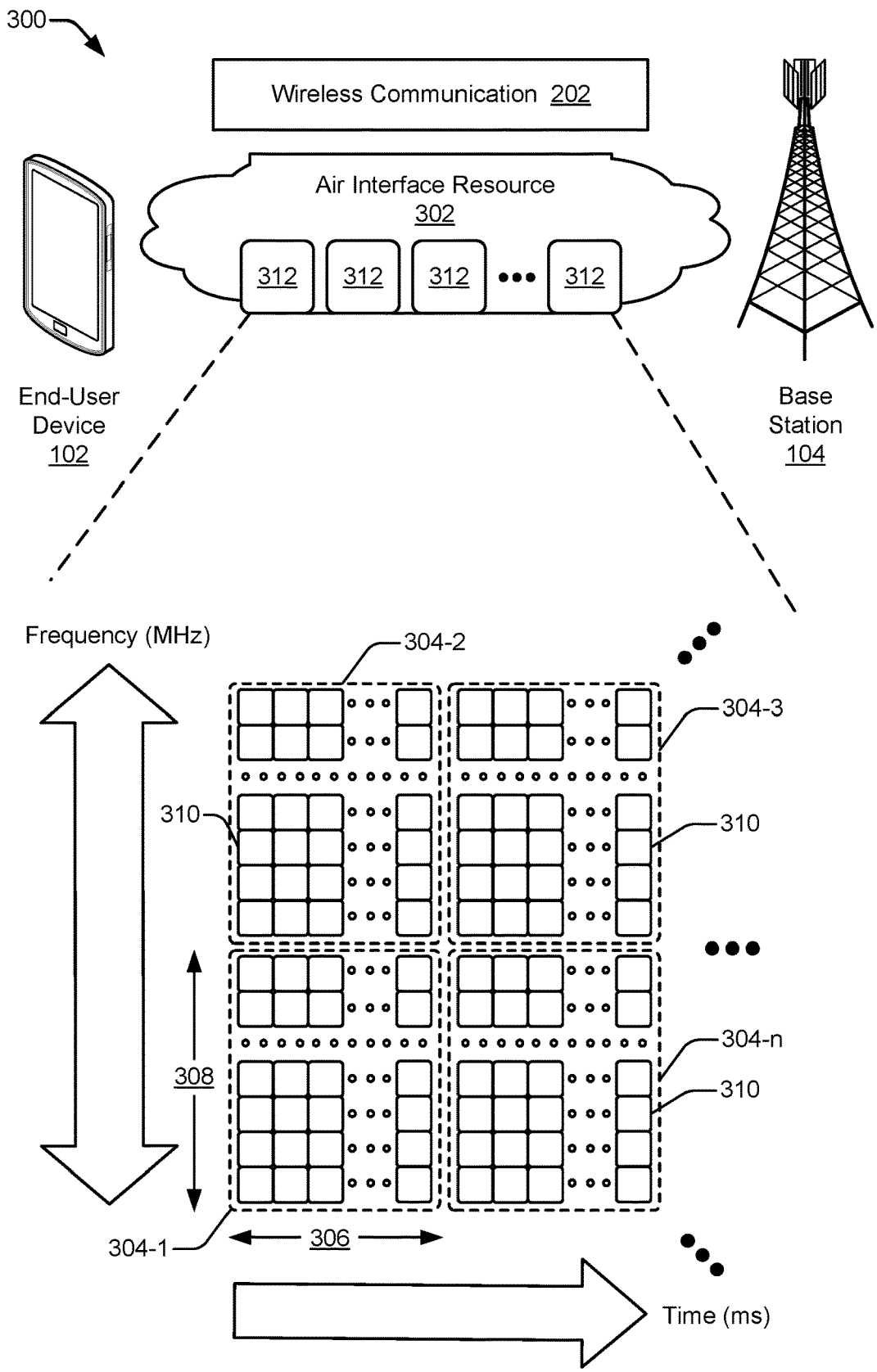
FIG. 3 illustrates an example of an air interface resource extending between an end-user device and a base station that can be strategically utilized to enhance beamforming.

FIG. 3 illustrates an example of an air interface resource 302 extending between an end-user device 102 and a base station 104. The air interface resource 302 can be strategically utilized to enhance antenna beamforming as described herein. The air interface resource 302 can be divided into resource units 312, each of which occupies some intersection of frequency spectrum and elapsed time. A portion of the air interface resource 302 is illustrated graphically in a grid or matrix having multiple resource blocks 304, including resource blocks 304-1, 304-2, 304-3 . . . 304-n, with "n" representing some positive integer. An example of a resource unit 312 therefore includes at least one resource block 304. As shown, time is depicted along the horizontal dimension as the abscissa axis, and frequency is depicted along the vertical dimension as the ordinate axis. The air interface resource 302, as defined by a given communication protocol or standard, may span any suitable specified frequency range and/or may be divided into intervals of any specified duration. Increments of time can correspond to, for example, milliseconds (ms). Increments of frequency can correspond to, for example, megahertz (MHz).

In example operations generally, the base station 104 allocates portions (e.g., resource units 312) of the air interface resource 302 for UL and DL wireless communications 202. Each resource block 304 of network access resources may be allocated to support respective wireless communications 202 of multiple end-user devices 102. In the lower left corner of the grid, the resource block 304-1 may span, as defined by a given communication protocol, a specified frequency range 308 and comprise multiple subcarriers. The resource block 304-1 may include any suitable number of subcarriers (e.g., 12) that each correspond to a respective portion (e.g., 15 kHz) of the specified frequency range 308 (e.g., 180 kHz). The resource block 304-1 may also span, as defined by the given communication protocol, a specified time interval 306 or time slot (e.g., lasting approximately one-half millisecond or 7 orthogonal frequency-division multiplexing (OFDM) symbols). The time interval 306 includes subintervals that may each correspond to a symbol, such as an OFDM symbol. As shown in FIG. 3, each resource block 304 may include multiple resource elements 310 (REs) that correspond to, or are defined by, a subcarrier of the frequency range 308 and a subinterval (or symbol) of the time interval 306. Alternatively, a given resource element 310 may span more than one frequency subcarrier or symbol. Thus, a resource unit 312 may include at least one resource block 304, at least one resource element 310, and so forth.

In example implementations, multiple end-user devices 102 (one of which is shown) are communicating with the base station 102 through access provided by portions of the air interface resource 302. A resource manager (not shown in FIG. 3) may determine a respective type or amount of information (e.g., data or control information) to be communicated (e.g., transmitted) by the end-user device 102. For example, the resource manager can determine that each end-user device 102 is to transmit a different respective amount of information. The resource manager then allocates one or more resource blocks 304 to each end-user device 102 based on the determined amount of information.

Additionally or in the alternative to block-level resource grants, the resource manager may allocate resource units at an element-level. Thus, the resource manager may allocate one or more resource elements 310 or individual subcarriers to different end-user devices 102. By so doing, one resource block 304 can be allocated to facilitate network access for multiple end-user devices 102. Accordingly, the resource manager may allocate, at various granularities, one or up to all subcarriers or resource elements 310 of a resource block 304 to one end-user device 102 or divided across multiple end-user devices 102, thereby enabling higher network utilization or increased spectrum efficiency.

The resource manager can therefore allocate air interface resource 302 by resource block 304, frequency carrier, time interval, resource element 310, frequency subcarrier, time subinterval, symbol, spreading code, some combination thereof, and so forth. Based on respective allocations of resource units, the resource manager can transmit respective messages to the end-user devices 102 indicating the respective allocation of resource units to each device. Providing indications of allocated resource units is described further below with reference to FIG. 5. Each message may enable a respective end-user device 102 to queue the information or configure a communication unit 120 to communicate via the allocated resource units of the air interface resource 302. For example, an end-user device 102 can prepare an antenna beamformer to steer a signal beam back to the base station 104. To do so, the end-user device 102 can train the beamformer responsive to receipt of a signal transmitted from the base station 104.

Figure 4:
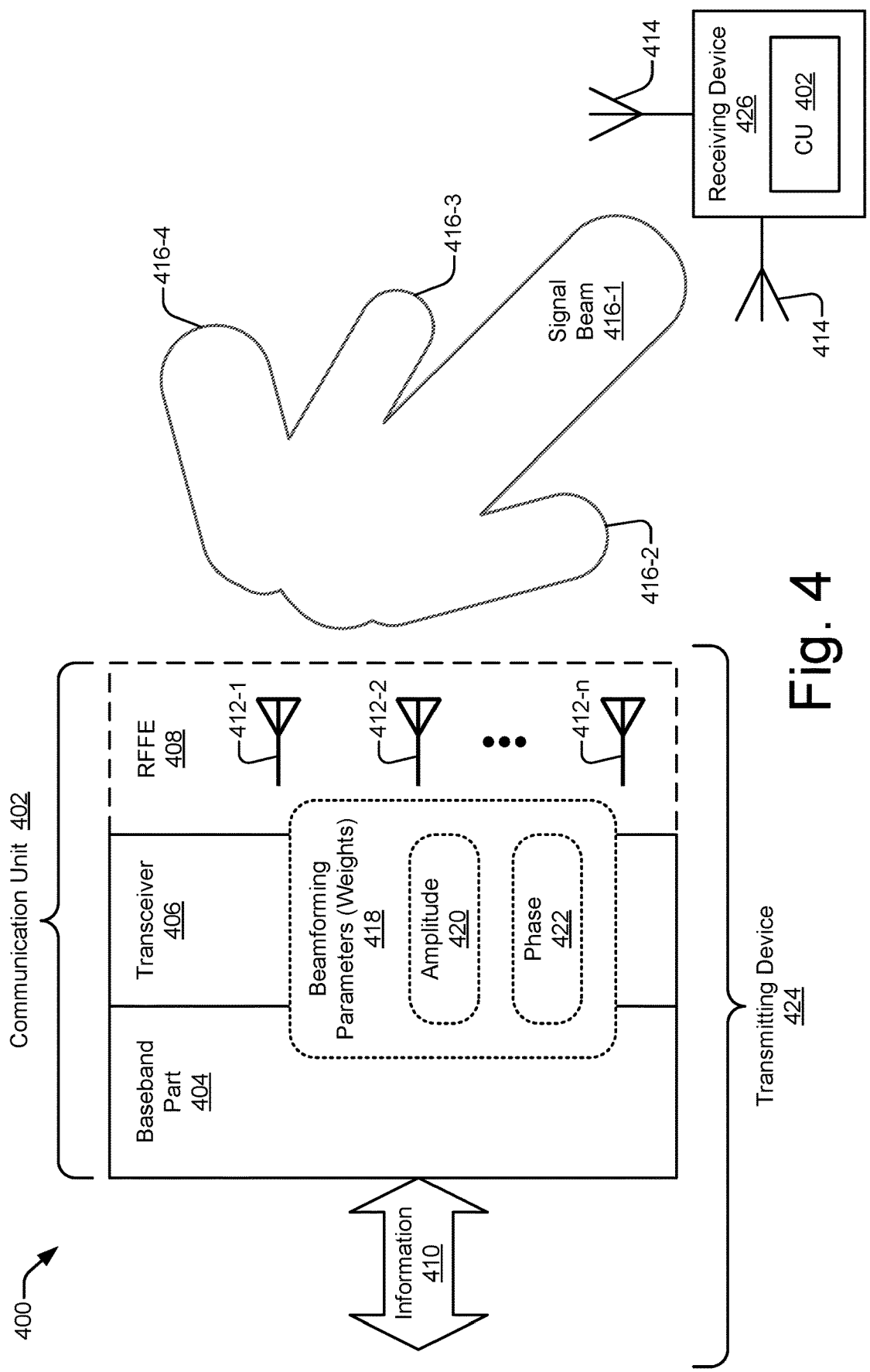
FIG. 4 illustrates an example of a communication unit that is configured to implement beamforming to generate signal beams.

FIG. 4 illustrates an example beamforming scenario 400 including a transmitting device 424 and a receiving device 426. The transmitting device 424 includes an example of a communication unit 402 that is configured to implement antenna beamforming to generate multiple signal beams 416. As shown, the communication unit 402 is transmitting four signal beams 416-1, 416-2, 416-3, and 416-4; however, more or fewer signal beams 416 can be generated. The multiple signal beams 416 are formed such that a first signal beam 416-1 extends farther than the other signal beams. Additionally, the communication unit 402 aims the first signal beam 416-1 in a direction toward the receiving device 426.

In some situations, an end-user device 102 (e.g., of FIGS. 1-3) functions as the transmitting device 424, and a base station 104 functions as the receiving device 426. In other situations, the base station 104 functions as the transmitting device 424, and the end user device 102 functions as the receiving device 426. Thus, in the former situations, the communication unit 402 corresponds to a communication unit 120 of the end-user device 102, but the communication unit 402 corresponds to a communication unit 130 of the base station 104 in the latter situations.

The communication unit 402 is configured to transmit information 410 (e.g., data or control information) or receive information 410. The communication unit 402 includes a baseband (BB) part 404, a transceiver 406 (e.g., a transmitter or a receiver), and an RF front end (RFFE) 408. The RFFE 408 includes multiple antennas 412-1, 412-2 . . . 412-n, with "n" representing some positive integer. The multiple antennas 412 may jointly form an antenna array or each antenna 412 may include multiple antenna elements that function as an array. An RF signal that is transmitted from different ones of the multiple antennas 412 constructively and destructively combine at different physical or geo spatial locations to create multiple signal beams 416 that provide different spatial patterns for the resulting signal beams 416. In addition to direction, each signal beam 416 can have a different height, shape along the beam, width, shape of incidence on the earth's surface, length, and so forth.

Typically, the baseband part 404 includes at least one baseband processor to modulate or apply the information 410 to a baseband signal. The transceiver 406 includes one or more lowpass filters and processes the baseband signal to upconvert or down-convert the frequency using at least one mixer. The RFFE 408, in addition to the multiple antennas 412, includes one or more bandpass filters. The RFFE 408 also includes one or more low-noise amplifiers (LNAs) for receiving signals and one or more power amplifiers (PAs) for transmitting signals. The transceiver 406 or the RFFE 408 can include one or more phase shifters to delay a signal in time or change a phase thereof.

The communication unit 402 generates different patterns for the signal beams 416 by adjusting one or more beamforming parameters 418. The beamforming parameters 418 can also be referred to as weights. The beamforming parameters 418 establish different amplitudes 420, phases 422, and so forth for each signal version that is provided to one of the multiple antennas 412. By changing aspects of the signals emanating from the multiple antennas 412, the manners and geospatial locations at which the RF signals interact changes, which produces different signal beam patterns.

Beamforming parameters 418 can be implemented at any portion of the communication unit 402. For example, the baseband part 404 can implement beamforming parameters 418 using precoding at a baseband processor. The transceiver 406 or the RFFE 408 can implement beamforming parameters 418 using, for instance, phase shifters to shift the phase of one signal version relative to that of other signal versions. Alternatively, a hybrid approach can be implemented in which beamforming parameters 418 are established partially at the baseband part 404 and partially at the transceiver 406 or the RFFE 408.

As shown in FIG. 4, the receiving device 426 also includes a communication unit (CU) 402. The receiving device 426 can therefore use the communication unit 402 to transmit or receive beamformed signals. Further, although the communication unit 402 of the transmitting device 424 is described above primarily in terms of transmitting a signal beam 416-1, each communication unit 402 can also receive signals using antenna beamforming. In other words, the inverse beamforming process can be implemented by the receiving device 426. To do so, the communication unit 402 at the receiving device 426 receives multiple RF signals at multiple antennas 414 and processes the multiple RF signals using different beamforming parameters 418 until a received signal beam 416 is detected that has a sufficiently strong signal.

This process of searching for beamforming parameters 418 that are at least acceptable for receiving a signal beam 416 is called training the communication unit 402 to receive the signal beam 416 or training the beamformer. A beamforming training module 118 (of FIG. 1) of an end-user device 102 or a beamforming training module 128 (of FIG. 1) of a base station 104 can implement beamforming training. Because RF propagation is at least partially reciprocal in nature, the beamforming parameters 418 that are determined as part of a receive operation at the receiving device 426 can be used for transmission as well. In other words, beamforming parameters 418 that are good for receiving a signal beam 416 from one device can then be used for transmitting another signal beam 416 back to the device. Similarly, beamforming parameters 418 that have been confirmed as being good for transmitting can be used for receiving.

Thus, antenna beamforming during transmission keeps the beamformer warm (e.g., primed with recently-determined beamforming parameters 418) for subsequent reception, and antenna beamforming during reception keeps the beamformer warm for subsequent transmission. Keeping the beamformer warm by maintaining current beamforming parameters 418 can therefore reduce latency and the usage of unproductive, inefficient transmissions and receptions. This is especially true if the transmitting or receiving device is moving or the signal propagation channel is otherwise rapidly changing. Strategic resource utilization as described herein can therefore be used to enhance beamforming by helping to keep a beamformer warm as channel conditions change or as the location of at least one device that is party to a communication moves.

Example Schemes, Devices, and Components

Figure 5:
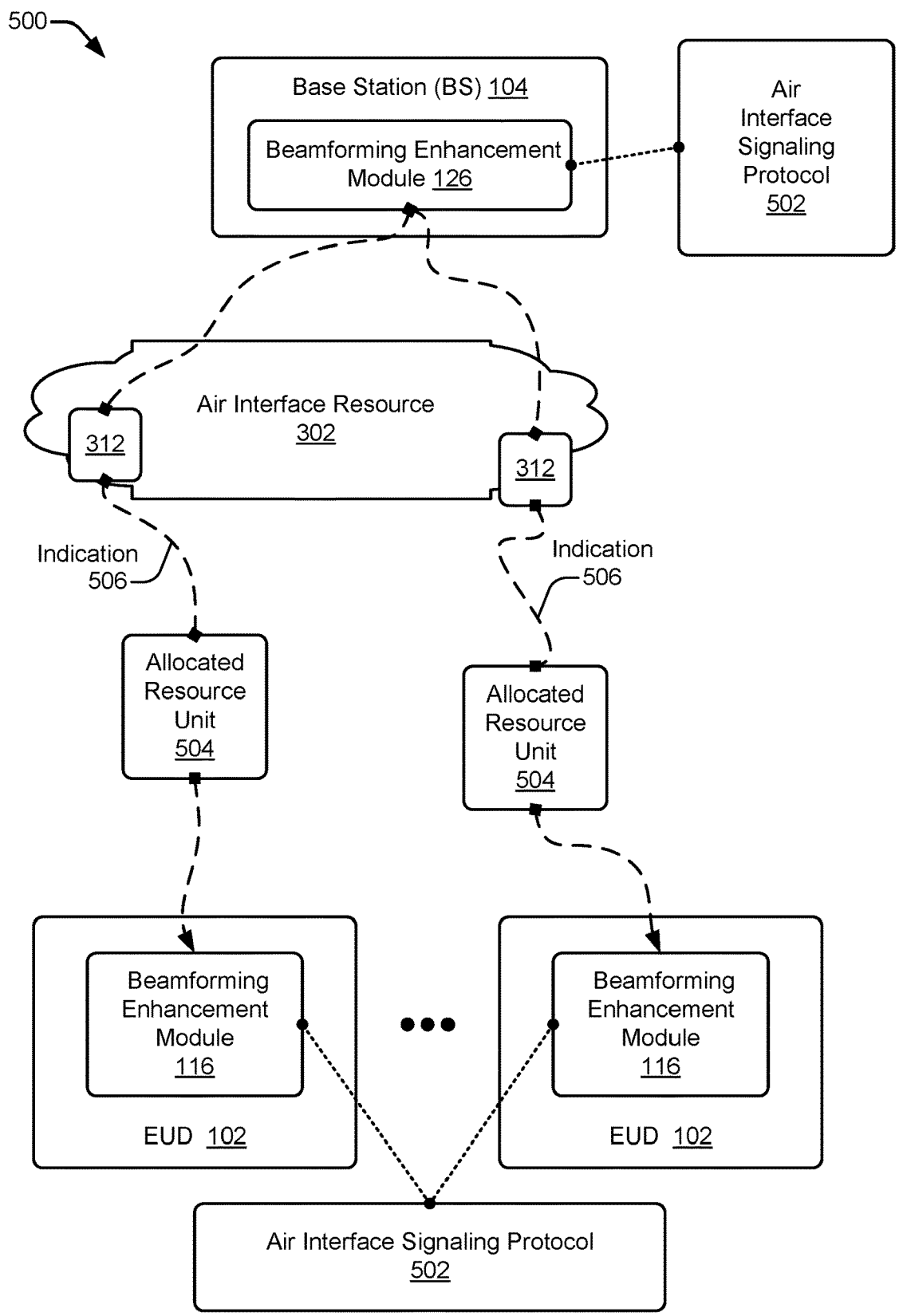
FIG. 5 illustrates an example environment in which beamforming enhancement via strategic resource utilization can be implemented in accordance with an air interface signaling protocol.

FIG. 5 illustrates an example environment 500 in which beamforming enhancement via strategic resource utilization can be implemented in accordance with an air interface signaling protocol 502. As illustrated, a base station 104 includes a beamforming enhancement module 126, and multiple end-user devices 102 each include a beamforming enhancement module 116. In some implementations, both the beamforming enhancement module 116 and the beamforming enhancement module 126 operate in accordance with, or otherwise adhere to, the air interface signaling protocol 502. The air interface signaling protocol 502 specifies procedures, specifications, operating parameters, techniques, timings, and so forth that enable the end-user device 102 and the base station 104 to individually or jointly implement beamforming enhancement via strategic resource utilization as described herein. In an example operation, the base station 104 allocates resource units 312 (e.g., resource blocks 304 or resource elements 310) from the air interface resource 302 to multiple end-user devices 102 at least partially in accordance with the air interface signaling protocol 502 to produce allocated resource units 504. The base station 104 transmits indications 506 of the allocated resource units 504 to the multiple end-user devices 102.

In example implementations, the air interface resource 302 is strategically utilized by allocating frequency-time resource units 312 so as to keep a beamformer in an end-user device 102 and/or in a base station 104 "warm." In other words, the beamforming enhancement module 126 grants allocated resource units 504 from the air interface resource 302 to multiple end-user devices 102 to keep beamforming parameters 418 (of FIG. 4) current—e.g., sufficiently recently-determined to enable the parameters to be reused for a subsequent wireless communication. To do so, the beamforming enhancement module 116 and the beamforming enhancement module 126 individually or jointly implement the air interface signaling protocol 502 to provide opportunities to train a beamformer at the end-user device 102 or the base station 104.

Figure 6:
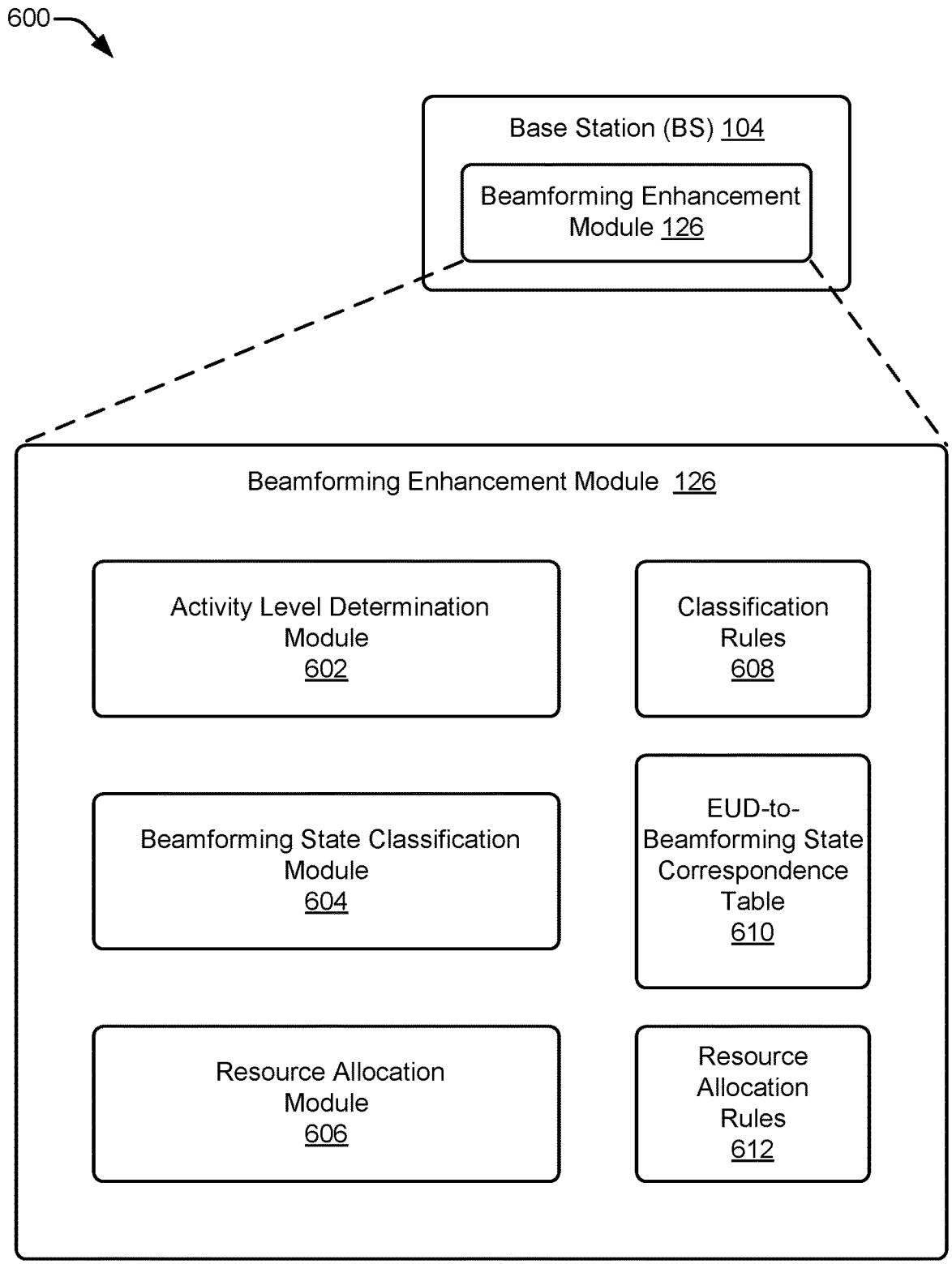
FIG. 6 illustrates an example beamforming enhancement module for a base station to implement beamforming enhancement via strategic resource utilization.

FIG. 6 illustrates generally at 600 an example beamforming enhancement module 126 for a base station 104 to implement beamforming enhancement via strategic resource utilization. The beamforming enhancement module 126 can include one or more of the illustrated modules or rules. Each individual module or set of rules can include instructions or code that are stored in at least one computer-readable storage memory and that are executable by one or more processors. The modules or rule sets can be distributed across different memories and/or executed by one or by multiple processors.

As illustrated, the beamforming enhancement module 126 includes an activity level determination module 602, a beamforming state classification module 604, and a resource allocation module 606. The beamforming enhancement module 126 further includes one or more classification rules 608, at least one end-user device-to-beamforming state correspondence table 610, and one or more resource allocation rules 612. Example operations for the activity level determination module 602 and the beamforming state classification module 604, in conjunction with the classification rules 608 and the EUD-to-beamforming state correspondence table 610, are described below with reference to FIG. 7. Example operations for the resource allocation module 606, in conjunction with the resource allocation rules 612, are described below with reference to FIGS. 8-11.

Figure 7:
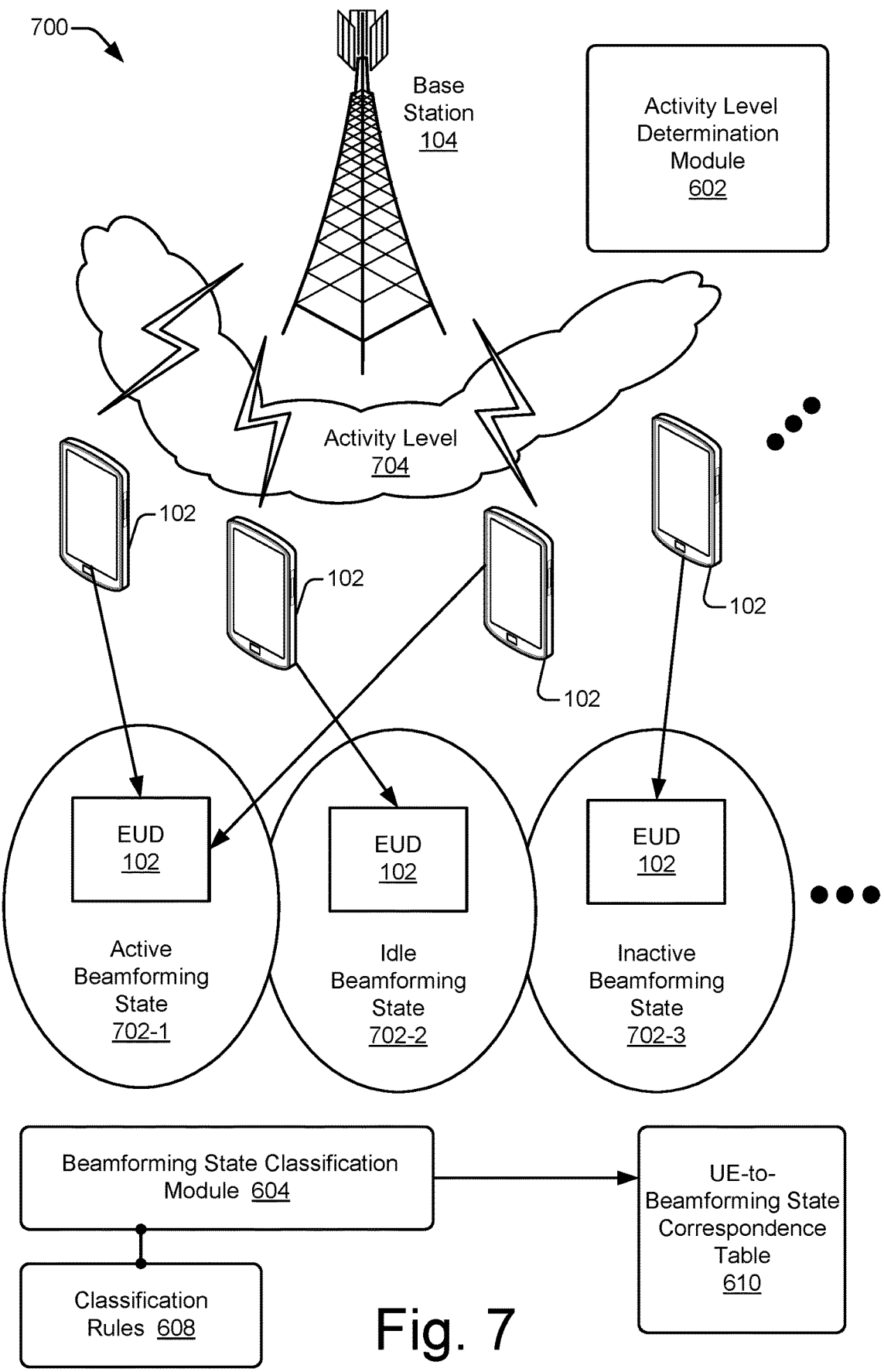
FIG. 7 illustrates an example scheme for classifying end-user devices into beamforming states based on a determined activity level.

FIG. 7 illustrates an example scheme 700 for classifying end-user devices 102 into beamforming states 702 based on a determined activity level 704. In FIG. 7, multiple end-user devices 102 are associated with a base station 104. Each end-user device 102 has a respective activity level 704 with regard to the base station 104. In example implementations, the activity level determination module 602 determines the respective activity level 704 for each respective end-user device 102. The activity level 704 can correspond to, for example, how often a wireless communication is transmitted or received (e.g., a frequency of wireless communications), how much data is being exchanged between the respective end-user device 102 and the base station 104 per unit of time (e.g., a communication bandwidth), how many resource blocks or other units of the air interface resource 302 (e.g., of FIGS. 3 and 5) are being allocated to the respective end-user device 102 within a given recent period, how much time has transpired since a portion of the air interface resource was allocated to the respective end-user device 102 for data UL or DL traffic, some combination thereof, and so forth. In some implementations, the determinations of the different activity levels of respective end-user devices 102 focuses on activity that utilizes beamforming (e.g., by prioritizing wireless communications that are effectuated using antenna beamforming or by excluding any wireless communications that are not effectuate using antenna beamforming).

Based on the determined respective activity levels 704 and one or more classification rules 608, the beamforming state classification module 604 classifies each respective end-user device 102 into a beamforming state 702. The classification rules 608 can identify, for example, different beamforming states 702 into which the end-user devices 102 can be classified. Additionally or alternatively, the classification rules 608 can specify activity level thresholds (e.g., in terms of bits per second, an average number of resource blocks, a total number of discrete wireless communication events in some time period, or an average duration between consecutive wireless communications) that correspond to different beamforming states 702 or delineate between different beamforming states 702. The classification rules 608 can also specify various activity types that correspond to different beamforming states 702. Activity type examples include control traffic versus data traffic, continuous versus sporadic/intermittent communications, and so forth.

An example set of beamforming states 702 include: an active beamforming state 702-1, an idle beamforming state 702-2, and an inactive beamforming state 702-3. The active beamforming state 702-1 corresponds to when UL or DL traffic is currently ongoing. For example, an end-user device 102 may be currently engaged with a voice call or streaming a video. An example analogy for this state is a vehicle that is in motion with a traditional internal combustion engine that is firing at high revolutions per minute (RPM). The idle beamforming state 702-2 corresponds to when UL or DL traffic is not occurring regularly, but additional future traffic is nevertheless likely. For example, an end-user device 102 may be experiencing an intermission or some delay period between downloading social media updates. An analogy for this state is a vehicle that is idling at a traffic light. The engine is not revving at a high RPM, but the engine is kept running to keep it warm and ready to provide power.

The inactive beamforming state 702-3 corresponds to when there is no recent UL or DL wireless communications. The classification rules 608 can specify a time span that qualifies as recent for purposes of assigning an inactive beamforming state. If an end-user device 102 is in the inactive beamforming state 702-3, no recent beamforming information is typically known. An analogy for this state is a vehicle that is in park with the engine turned off Typically, to leave the inactive beamforming state 702-3, a bidirectional beamforming training is conducted to determine current beamforming parameters 418 for both sides of a wireless communication. However, beamforming states 702 can be defined, numbered, or organized differently than these three examples. Further, the end-user device 102 is likely to have more insight as to how the device is being used from an application-layer perspective. Accordingly, the end-user device 102 can transmit to the base station 104 a message indicative of an expected future activity level or type. Additionally or alternatively, the active and idle beamforming states 702-1 and 702-2 can correspond to other activity levels of the end-user device 102. For instance, the idle beamforming state 702-1 can correspond to an idle state in which the end-user device is going to sleep or entering a low-power mode.

Using the determined activity levels 704 and the classification rules 608, the beamforming state classification module 604 associates each end-user device 102 with the beamforming state 702 into which the device has been classified. The beamforming state classification module 604 stores these associations in the EUD-to-beamforming state correspondence table 610. For example, each end-user device 102 may have a respective entry that includes an indication of the corresponding beamforming state 702. Alternatively, a beamforming state group that corresponds to a given beamforming state 702 may list multiple end-user devices 102 that have been classified into that given beamforming state 702. However, the EUD-to-beamforming state correspondence table 610 may be implemented in alternative manners.

Thus, the beamforming state classification module 604 classifies each end-user device 102 into a beamforming state 702. Those end-user devices 102 that are classified into a same beamforming state 702 can be combined into a beamforming state group for control or allocation purposes. For example, a resource allocation module 606 (e.g., of FIG. 6) can allocate resource units of the air interface resource 302 to each member of a given group using the same or similar resource allocation rules 612. Examples of allocation processes using one or more resource allocation rules 612 are described next.

Figure 8:
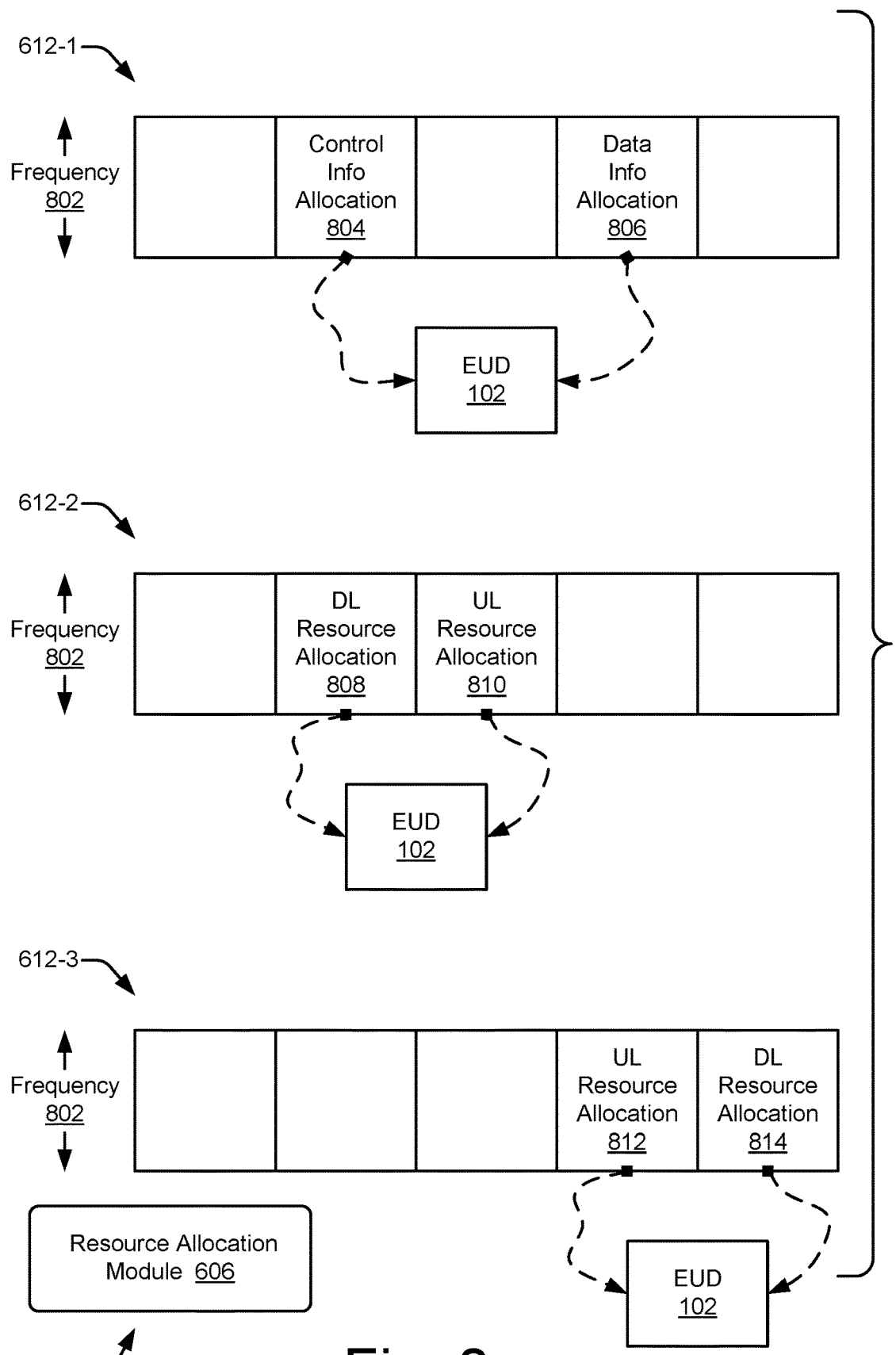
FIG. 8 illustrates examples of resource allocation rules for allocating resource units of an air interface resource to facilitate beamforming training.

FIG. 8 illustrates generally at 800 examples of resource allocation rules 612 for allocating resource units 312 of an air interface resource 302 to facilitate beamforming training. To illustrate each rule, a frequency band 802 versus some length of time is depicted as part of the air interface resource 302 (e.g., of FIGS. 3 and 5). The resource allocation rules 612-1 to 612-3 as illustrated in FIG. 8 pertain to end-user devices that are classified into an active beamforming state 702-1. With a resource allocation rule 612-1, the allocation includes scheduling both control communications and data communications on one or more same frequency bands for a given end-user device. As shown, control information allocation 804 and data information allocation 806 that correspond to a given end-user device (EUD) 102 are scheduled on at least one same frequency band 802. In other words, a resource allocation module 606 can schedule control and data on the same frequency tones for a given end-user device. This rule provides both the base station (e.g., a gNB) and the end-user device (e.g., a UE) opportunities to learn the channel. In 3GPP terminology, this corresponds to scheduling, for instance, the PUCCH, PDSCH, PHICH, and PUSCH on the same frequency tones for each given end-user device 102.

With a resource allocation rule 612-2, the scheduling includes granting a DL resource allocation to a given end-user device that is classified into the active beamforming state so as to precede an UL resource allocation for the given end-user device. As shown, a DL resource allocation 808 is granted to a given end-user device 102 so as to precede an UL resource allocation 810 for the given end-user device 102. In other words, for each UL grant from the base station to the end-user device (e.g., for outgoing data traffic), the resource allocation module 606 also provides a DL grant before the UL transmission and over the same frequency tone or tones. This enables the end-user device to train the beamformer on the DL portion of an UL/DL grant pair.

The content of the DL grant can include DL data information, DL control information (e.g., an indication of the UL grant or an UL ACK/NACK), a sounding transmission, and so forth. The DL grant may be implicit or explicit. In the case of an explicit grant, the corresponding DL transmission may have a shorter time duration or may perform a frequency/time interlace to cover a full frequency assignment of the UL transmission to facilitate beamforming training across the full assigned spectrum.

With a resource allocation rule 612-3, the scheduling includes granting an uplink resource allocation to a given end-user device that is classified into the active beamforming state so as to precede a downlink resource allocation for the given end-user device. As shown, an UL resource allocation 812 is granted to a given end-user device 102 so as to precede a DL resource allocation 814 of the given end-user device 102. In other words, for each DL grant from the base station to the end-user device (e.g., for data traffic arriving at the mobile device), the resource allocation module 606 also provides an UL grant before the DL transmission and over the same frequency tone or tones. This enables the end-user device to train the beamformer on the UL portion of an UL/DL grant pair.

The content of the UL grant can include UL data information, UL control information (e.g., measurement information or a DL ACK/NACK), a sounding transmission, and so forth. This UL grant may be implicit or explicit. In the case of an explicit grant, the corresponding UL transmission may have a shorter time duration or may perform a frequency/time interlace to cover the full frequency assignment of the DL transmission. The resource allocation rules 612-1 to 612-3 are described above in terms of being applied to end-user devices 102 that have been classified into the active beamforming state 702-1 (of FIG. 7). However, a resource allocation module 606 can also apply any one or more of these three rules to end-user devices 102 that have been classified into the idle beamforming state 702-2.

As shown for the resource allocation rule 612-2, the preceding grant of the DL resource allocation 808 is adjacent to the grant of the UL resource allocation 810. Similarly, for the resource allocation rule 612-3, the preceding grant of the UL resource allocation 812 is adjacent to the grant of the DL resource allocation 814. As used in this context, two allocations for a given end-user device may be adjacent to each other if no resource unit or units disposed between the two allocations (if any are so disposed) are granted to any other end-user device. Alternatively, two allocations for a given end-user device may be adjacent to each other if no definable resource units (e.g., neither a resource block 304 nor a resource element 310) are present between the two allocations. Here, a definable resource unit may correspond to some resource block 304, a resource element 310, and so forth.

Figure 9:
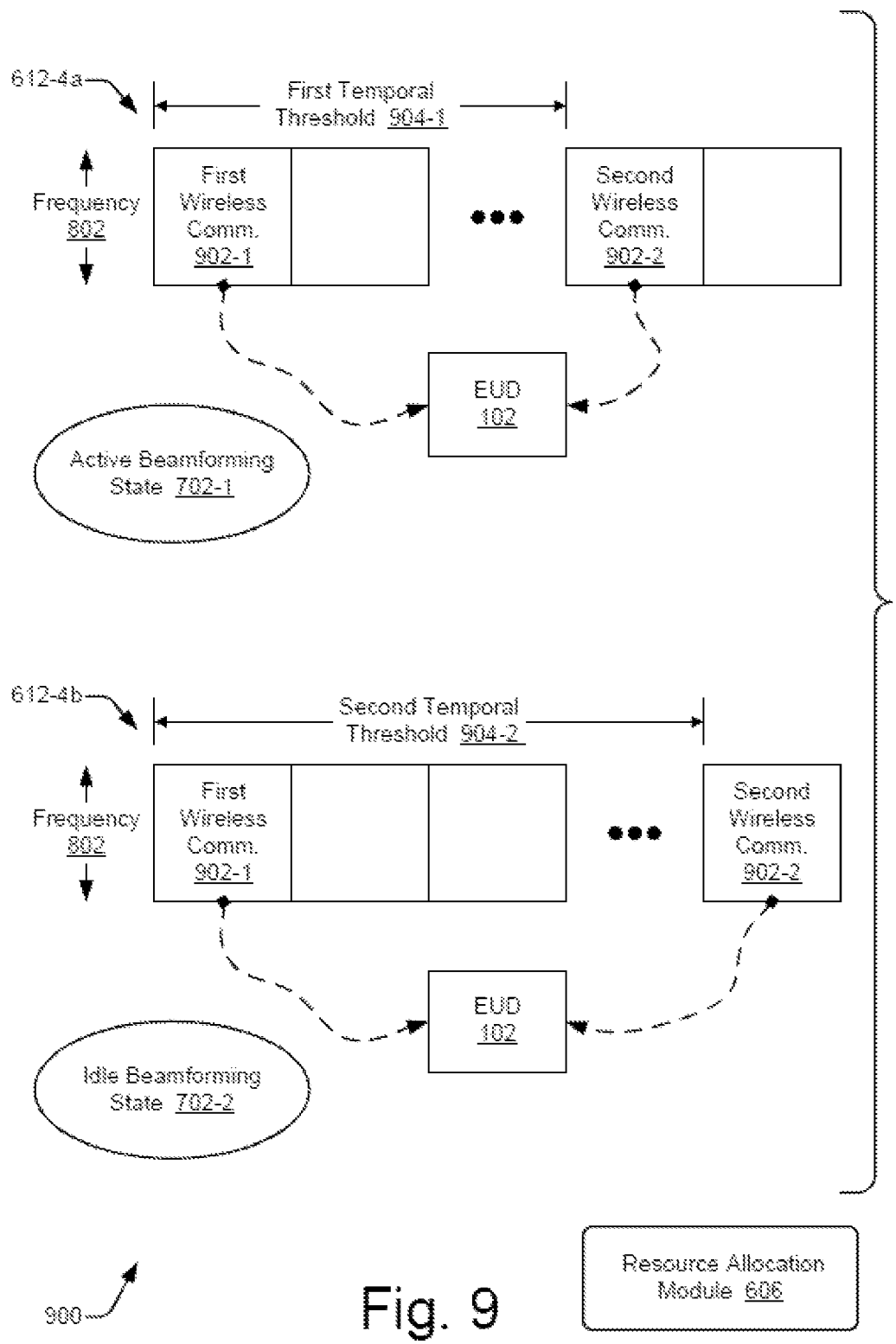
FIG. 9 illustrates additional examples of resource allocation rules for allocating resource units of an air interface resource to facilitate beamforming training.

FIG. 9 illustrates generally at 900 additional examples of resource allocation rules 612 for allocating resource units 312 of an air interface resource 302 to facilitate beamforming training. For each rule, a frequency band 802 versus some length of time is depicted as having multiple resource allocations as part of the air interface resource 302. Each resource allocation may be identified as a wireless communication 902, including a first wireless communication 902-1 and a second wireless communication 902-2. In this context, each wireless communication 902 may include an uplink transmission, a downlink transmission, or both. In the top half of FIG. 9, a resource allocation rule 612-4a corresponds to the active beamforming state 702-1. In the lower half, a resource allocation rule 612-4b corresponds to the idle beamforming state 702-1.

With the resource allocation rule 612-4a, for a given end-user device 102 that is classified into the active beamforming state 702-1, scheduling includes scheduling a wireless communication 902 to recur at a period that does not exceed a first temporal threshold 904-1. As shown, the second wireless communication 902-2 is scheduled to occur (e.g., start or conclude) from the occurrence of the first wireless communication 902-1 after an elapsed time period that is not permitted to exceed the first temporal threshold 904-1. Thus, the resource allocation module 606 allocates the second wireless communication 902-2 to follow the first wireless communication 902-1 by no more than the first temporal threshold 904-1.

With the resource allocation rule 612-4b, for a given end-user device 102 that is classified into the idle beamforming state 702-2, scheduling includes scheduling a wireless communication 902 to recur at a period that does not exceed a second temporal threshold 904-2. As shown, the second wireless communication 902-2 is scheduled to occur (e.g., start or conclude) from the occurrence of the first wireless communication 902-1 after an elapsed time period that is not permitted to exceed the second temporal threshold 904-2. Thus, the resource allocation module 606 allocates the second wireless communication 902-2 to follow the first wireless communication 902-1 by no more than the second temporal threshold 904-2. These temporal thresholds 904 may be adjustable to account for channel condition, cell congestion, and so forth.

By adhering to a temporal threshold 904 that establishes a maximum period between successive wireless communications 902, the resource allocation module 606 can keep the beamforming parameters 418 current. In some implementations, the temporal thresholds 904 differ in length. For example, the first temporal threshold 904-1 that corresponds to the active beamforming state 702-1 is implemented to be shorter than the second temporal threshold 904-2 corresponding to the idle beamforming state 702-2. For instance, the first temporal threshold 904-1 can last X ms, and the second temporal threshold 904-2 can last Y ms, where X is smaller than Y. This enables a tradeoff between beamforming information recency and resource usage overhead. For example, this enables beamforming information to be relatively recent for end-user devices in the idle beamforming state 702-2, but with less overhead as compared to that for end-user devices in the active beamforming state 702-1. The length of X and Y, or the time separating two consecutive wireless communications 902 for a given end-user device 102, can be set based on a number of factors. Factors include, for example, how much the channel is varying, how quickly the beamforming parameters are changing, how closely a signal beam is to be tracked, and so forth.

Figure 10:
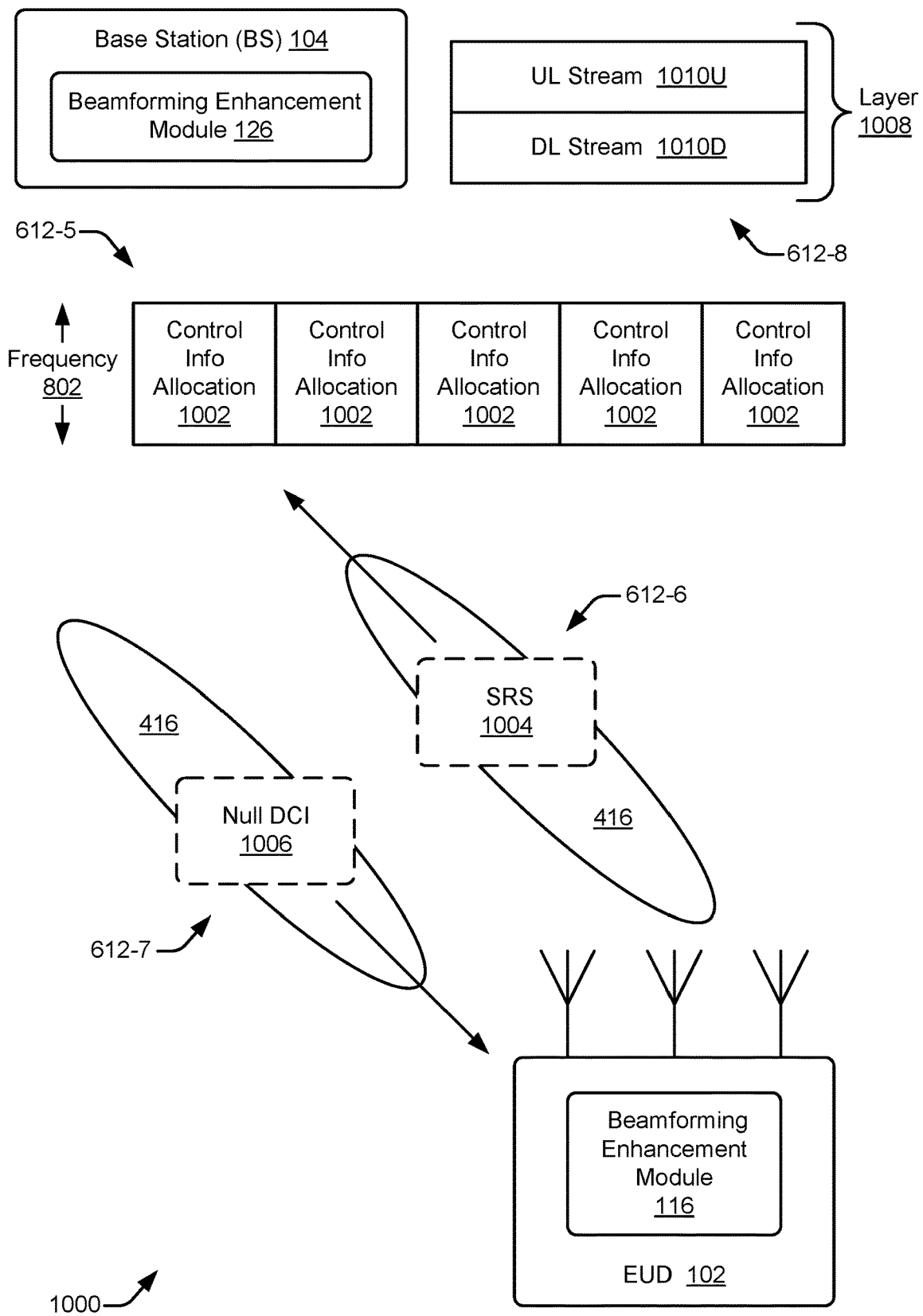
FIG. 10 illustrates other examples of resource allocation rules for allocating resource units of an air interface resource to facilitate beamforming training.

FIG. 10 illustrates generally at 1000 other examples of resource allocation rules 612 for allocating resource units 312 of an air interface resource 302 to facilitate beamforming training. The resource allocation rules 612-5 to 612-8 can be implemented individually or jointly. Each can provide additional opportunities for beamforming training. For a resource allocation rule 612-5, a frequency band 802 versus some length of time is depicted as having multiple resource allocations as part of the air interface resource 302. Each resource allocation is identified as including control information for a control information allocation 1002. In some implementations, beamforming for control information can be configured independently by the beamforming enhancement module 126. Using this scheme, a narrow sub-band can enable a majority of end-user devices 102 to remain in an active beamforming state while having little to no data traffic. This keeps a recent beamformer maintained so that a user can be quickly communicated with if appropriate. This scheme can be alternatively implemented with a wideband frequency control region.

With a resource allocation rule 612-6, the beamforming enhancement module 116 controls the end-user device 102 to transmit a sounding reference signal (SRS) 1004 using at least one signal beam 416. For example, the beamforming enhancement module 116 can configure an antenna array including multiple antennas to generate a signal beam 416 that transmits the SRS 1004. The SRS 1004 provides a (e.g., known) reference signal that the base station 104 can use to analyze the channel characteristics, such as the channel quality, of the uplink from the end-user device 102. In some implementations, the SRS 1004 is beamformed based on a DL broadband communication of a cell-specific reference signal (CRS) or a channel state information reference signal (CSI-RS).

With a resource allocation rule 612-7, the beamforming enhancement module 126 controls the base station 104 to transmit a null downlink control indicator (DCI) 1006 in at least one signal beam 416. For example, if no other DL traffic is scheduled for transmission by the base station 104, the beamforming enhancement module 126 schedules a null (e.g., empty, predetermined, fixed, or otherwise non-informative with respect to the downlink) DCI. In operation, the beamforming enhancement module 126 causes the base station 104 to emit one or more signal beams 416 that include the null DCI 1006.

With a resource allocation rule 612-8, the base station 104 balances UL streams 1010U with DL streams 1010D on each layer 1008. For example, the resource allocation module 606 (not shown in FIG. 10) of the beamforming enhancement module 126 can be configured to balance, on a per-layer basis, a number of UL streams 1010U with a number of downlink streams 1010D based on the resource allocation rule 612-8. This scheme can produce, for instance, the same number of UL streams 1010U and downlink streams 1010D as the number of layers 1008 that are employed. Consequently, the UL and DL beams for each layer can train the corresponding beam for that layer 1008 in the other direction.

Figure 11:
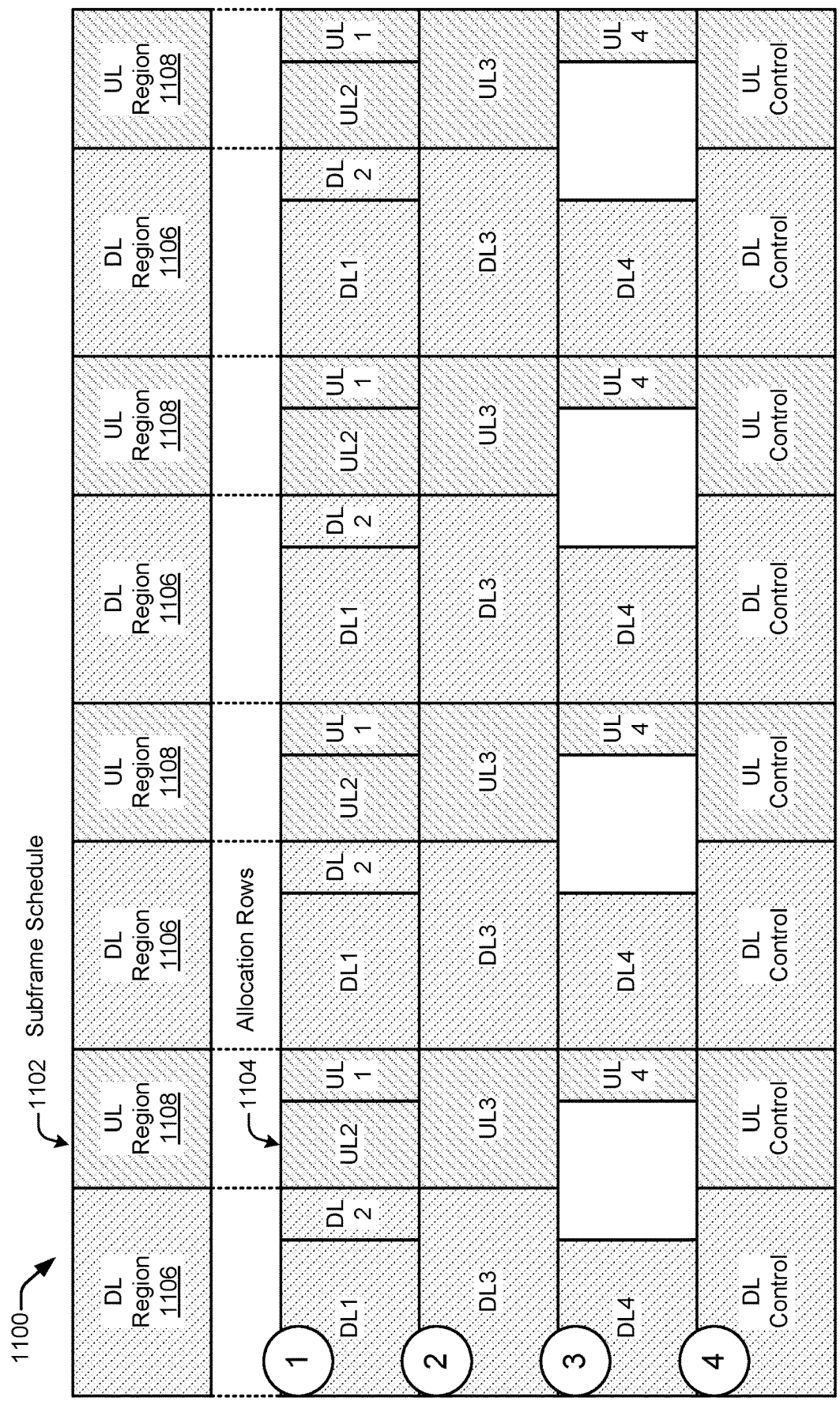
FIG. 11 illustrates, for a portion of an air interface resource, a scheduling example having multiple sample allocations for different end-user devices.

FIG. 11 illustrates, for a portion of an air interface resource, a scheduling example 1100 having multiple sample allocations for different end-user devices. The scheduling example 1100 includes a subframe schedule 1102 and four allocation rows 1104. The subframe schedule 1102 depicts multiple alternating regions indicative of how the air interface resource can be allocated over time for each frequency range or row. These regions include a DL region 1106 and an UL region 1108. The DL regions 1106 are shaded with a dotted pattern, and the UL regions 1108 are shaded with a cross-hatched pattern. These patterns are carried downward into the allocation rows 1104. The allocation rows 1104 include first through fourth rows, each of which is indicated with an encircled numeral. Each of the granted allocations across the four rows has a pattern indicative of being assigned to the uplink "UL" versus being assigned to the downlink "DL" and a label that indicates to which user (1, 2, 3, or 4) the allocation has been granted.

In the allocation rows 1104, resource allocations for four different users are depicted across the first, second, and third rows. User 1 primarily has DL data traffic as shown in the first row. User 1 is therefore able to share the frequency range of the first row with user 2, which predominantly has UL data traffic. User 3 has both UL and DL data transfers as shown in the second row. User 4 primarily has DL traffic and does not consume all the resources of the third row. Thus, there are unused resource units available in the third row. In some implementations, all users transmit and receive control information in the DL and UL regions of the fourth row. In other implementations, users 1-4 can exchange control information in the frequency ranges they use for communicating data traffic (e.g., in the first through the third rows), but other users rely on the fourth row to exchange control information.

In the first row, each downlink grant "DL1" for the user 1 is preceded by an uplink grant "UL1" that is also for the user 1. Similarly, each uplink grant "UL2" for the user 2 is preceded by a downlink grant "DL2" that is also for the user 2. In the second row, user 3 does not share the resources with another user and consumes all the frequency-time resource units. Thus, each downlink grant "DL3" for the user 3 is preceded by an uplink grant "UL3" that is also for the user 3, and each uplink grant "UL3" for the user 3 is preceded by a downlink grant "DL3" for the user 3. In the third row, each downlink grant "DL4" for the user 4 is preceded by an uplink grant "UL4" that is also for the user 4. The white spaces in the third row represent unallocated resource units for that frequency range at certain times.

Having generally described schemes and apparatuses for beamforming enhancement via strategic resource utilization, this discussion now turns to example methods.

Example Methods

Example methods are described below with reference to various flow diagrams. These methods relate to beamforming enhancement via strategic resource utilization. Aspects of these methods may be implemented in, for example, hardware (e.g., fixed logic circuitry or general-purpose processors), firmware, or some combination thereof. These techniques may be realized using one or more of the electronic devices or components shown in FIG. 1-11 or 13 (an electronic device 1300 is described in FIG. 13 below), which devices or components may be further divided, combined, and so on. The electronic devices and components of these figures generally represent firmware, hardware, IC chips, circuits, or a combination thereof. Thus, these figures illustrate some of the many possible systems or apparatuses capable of implementing the described techniques.

Figure 12:
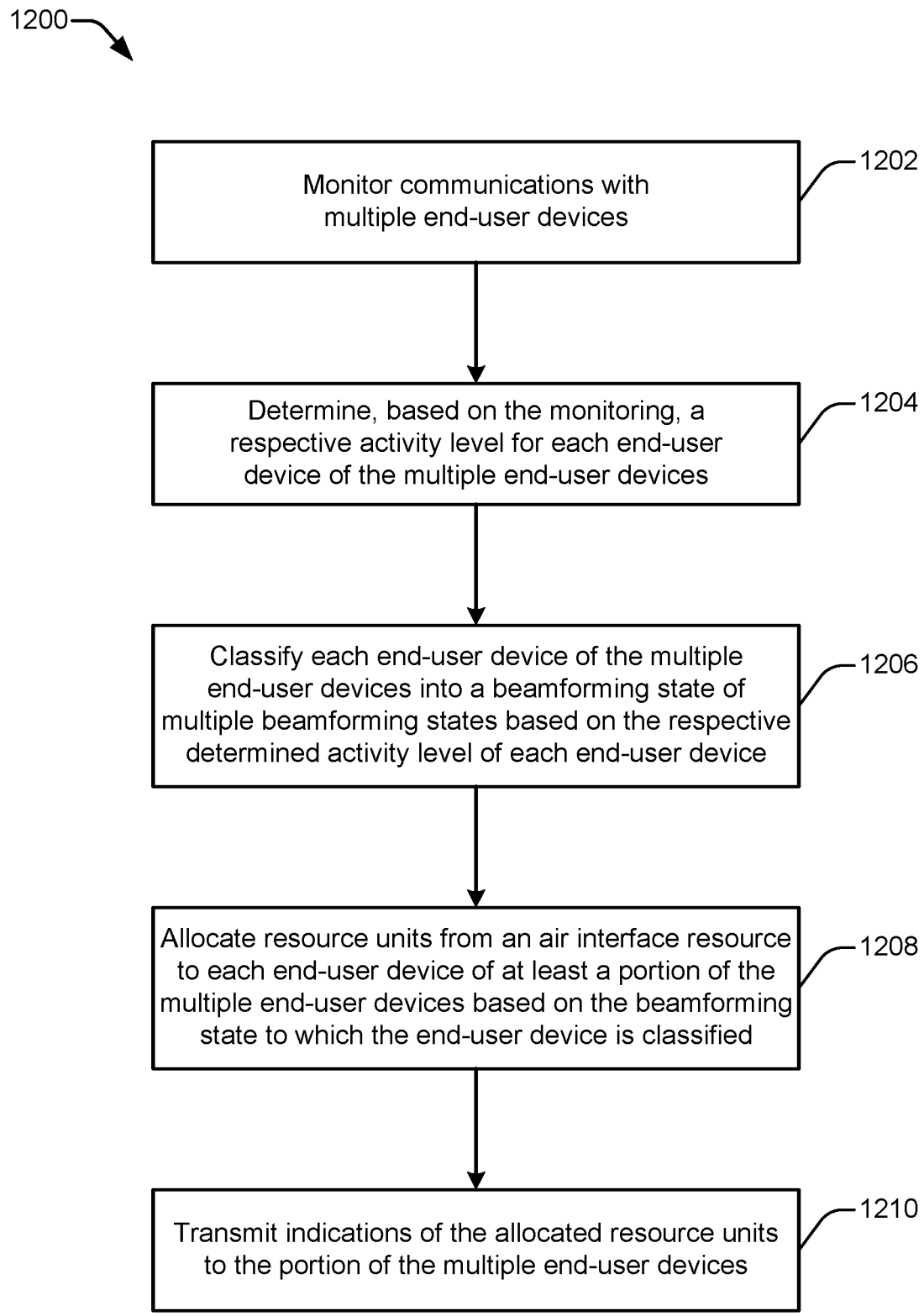
FIG. 12 illustrates example methods for implementing beamforming enhancement via strategic resource utilization.

For these flow diagrams, the orders in which operations are shown and/or described are not intended to be construed as a limitation. Any number or combination of the described method operations can be combined in any order to implement a method, or an alternative method. Further, described operations can be implemented in fully or partially overlapping manners. FIG. 12 illustrates example methods for implementing beamforming enhancement via strategic resource utilization at a flow diagram 1200. The flow diagram 1200 includes five operations 1202-1210.

At 1202, communications with multiple end-user devices are monitored. For example, an electronic device (e.g., a base station 104) can monitor wireless communications 202 with multiple end-user devices 102. For instance, an activity level determination module 602 may track the wireless communications 202 that occur between the base station 104 and each respective end-user device 102 using at least one respective signal beam 416.

At 1204, based on the monitoring, a respective activity level for each end-user device of the multiple end-user devices is determined. For example, the base station 104 can determine, based on the monitoring, a respective activity level 704 for each end-user device 102 of the multiple end-user devices 102. To do so, the activity level determination module 602 may compute how frequently or how continuously each respective end-user device 102 communicates with the base station 104 using a signal beam 416 to produce the respective activity level 704.

At 1206, each end-user device of the multiple end-user devices is classified into a beamforming state of multiple beamforming states based on the respective determined activity level of each end-user device. For example, an electronic device can classify each end-user device 102 of the multiple end-user devices 102 into a beamforming state 702 of multiple beamforming states 702 based on the respective determined activity level 704 of each end-user device 102. To perform a classification, a beamforming state classification module 604 may assign a beamforming state 702 (e.g., an active, idle, or inactive beamforming state 702-1, 702-2, or 702-3, respectively) to each end-user device 102 based on a respective corresponding activity level 704 using one or more classification rules 608.

At 1208, resource units from an air interface resource are allocated to each end-user device of at least a portion of the multiple end-user devices based on the beamforming state to which the end-user device is classified. For example, the base station 104 can allocate resource units 312 from an air interface resource 302 to each end-user device 102 of at least a portion of the multiple end-user devices 102 based on the beamforming state 702 to which the end-user device 102 is classified. The allocation may be performed by a resource allocation module 606 that applies one or more resource allocation rules 612 to grant the resource units 312 in manners that provide opportunities for beamforming training between the end-user device 102 and the base station 104 for uplink or downlink communications. The resource allocation rules 612 may be dependent on a corresponding beamforming state 702.

At 1210, indications of the allocated resource units are transmitted to the portion of the multiple end-user devices. For example, the base station 104 can transmit indications 506 of the allocated resource units 504 to the portion of the multiple end-user devices 102. For instance, a beamforming enhancement module 126 or a resource manager module (not depicted) may cause the base station 104 to transmit from a communication unit 402 one or more signal beams 416 having respective resource-allocation indications 506 to those end-user devices 102 that have been classified into an active beamforming state 702-1 or an idle beamforming state 702-2.

Example Electronic Device

Figure 13:
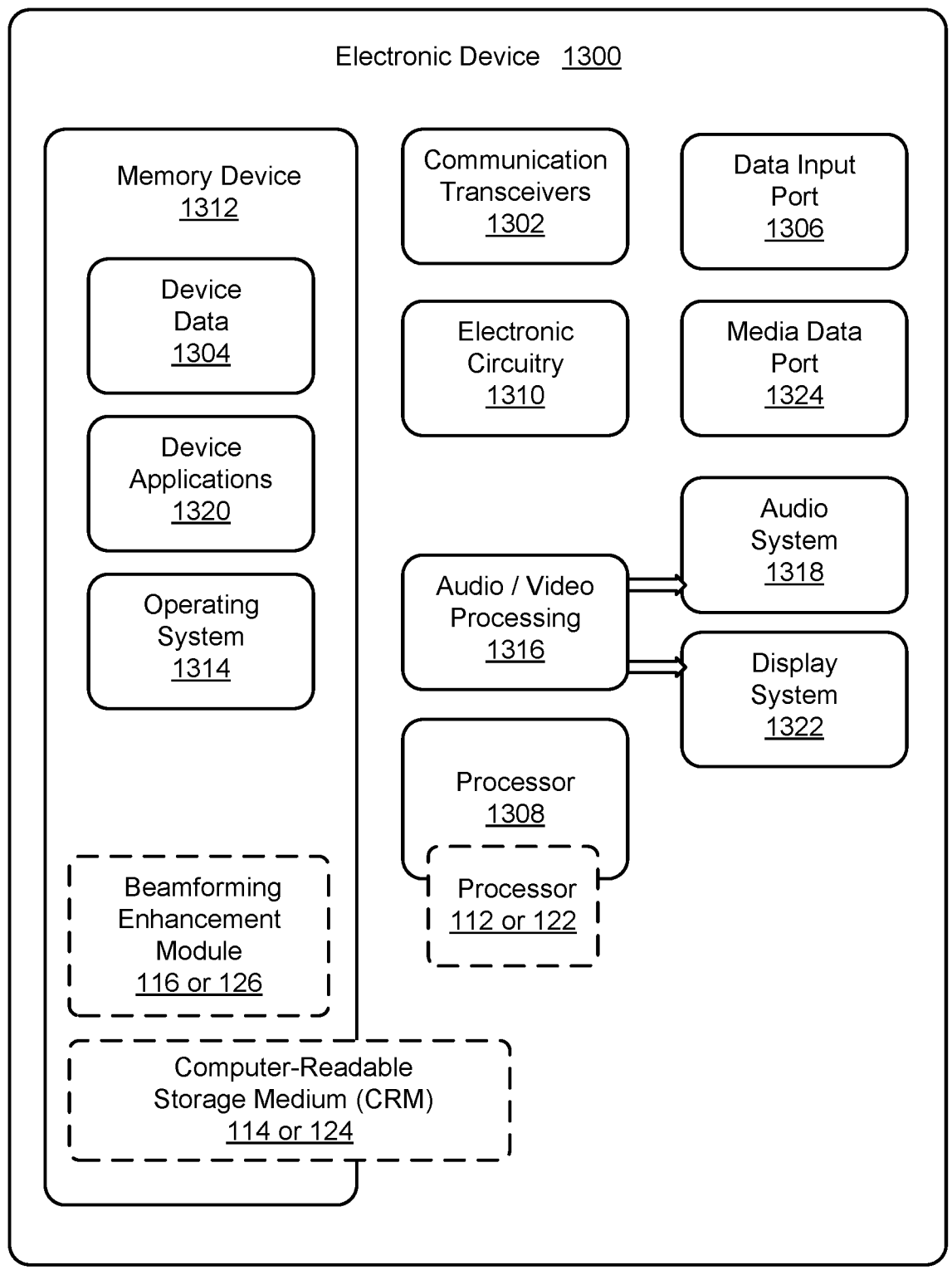
FIG. 13 illustrates various components of an example electronic device that can implement beamforming enhancement via strategic resource utilization in accordance with one or more implementations.

FIG. 13 illustrates various components of an example electronic device 1300 that can implement beamforming enhancement via strategic resource utilization in accordance with one or more implementations as described with reference to any of the previous FIGS. 1-12. The electronic device 1300 may be implemented as any one or combination of a fixed or mobile device, in any form of a consumer, computer, portable, user, server, communication, phone, navigation, gaming, audio, camera, messaging, media playback, and/or other type of electronic device or a base station device, including a cellular base station or a Wi-Fi access point.

Electronic device 1300 includes communication transceivers 1302 that enable wired and/or wireless communication of device data 1304, such as received data, transmitted data, or other information as described above. Example communication transceivers 1302 include NFC transceivers, WPAN radios compliant with various IEEE 802.15 (Bluetooth™) standards, WLAN radios compliant with any of the various IEEE 802.11 (WiFi™) standards, WWAN (3GPP-compliant) radios for cellular telephony, wireless metropolitan area network (WMAN) radios compliant with various IEEE 802.16 (WiMAX™) standards, and wired local area network (LAN) Ethernet transceivers.

The electronic device 1300 may also include one or more data input ports 1306 via which any type of data, media content, and/or other inputs can be received, such as user-selectable inputs, messages, applications, music, television content, recorded video content, and any other type of audio, video, and/or image data received from any content and/or data source. The data input ports 1306 may include USB ports, coaxial cable ports, and other serial or parallel connectors (including internal connectors) for flash memory, DVDs, CDs, and the like. These data input ports 1306 may be used to couple the electronic device to components, peripherals, or accessories such as keyboards, microphones, or cameras.

The electronic device 1300 of this example includes at least one processor 1308 (e.g., any one or more of application processors, microprocessors, digital-signal processors (DSPs), controllers, and the like), which can include a combined processor and memory system (e.g., implemented as part of an SoC), that processes (e.g., executes) computer-executable instructions stored on computer-readable media to control operation of the device. The processor 1308 may be implemented as an application processor, embedded controller, microcontroller, SoC, and the like. Generally, a processor or processing system may be implemented at least partially in hardware, which can include components of an integrated circuit or on-chip system, a digital-signal processor (DSP), an application-specific integrated circuit (ASIC), a field-programmable gate array (FPGA), a complex programmable logic device (CPLD), and other implementations in silicon and/or other hardware.

Alternatively or additionally, the electronic device 1300 can be implemented with any one or combination of electronic circuitry, which may include software, hardware, firmware, or fixed logic circuitry that is implemented in connection with processing and control circuits, which are generally indicated at 1310 (as electronic circuitry 1310). This electronic circuitry 1310 can implement executable or hardware-based modules (not shown) through logic circuitry and/or hardware (e.g., such as an FPGA), and so forth.

Although not shown, the electronic device 1300 can include a system bus, interconnect, crossbar, or data transfer system that couples the various components within the device. A system bus or interconnect can include any one or combination of different bus structures, such as a memory bus or memory controller, a peripheral bus, a universal serial bus, and/or a processor or local bus that utilizes any of a variety of bus architectures.

The electronic device 1300 also includes one or more memory devices 1312 that enable data storage, examples of which include random access memory (RAM), non-volatile memory (e.g., read-only memory (ROM), flash memory, EPROM, and EEPROM), and a disk storage device. The memory device(s) 1312 provide data storage mechanisms to store the device data 1304, other types of code and/or data, and various device applications 1320 (e.g., software applications or programs). For example, an operating system 1314 can be maintained as software instructions within the memory device 1312 and executed by the processor 1308.

As shown, the electronic device 1300 also includes an audio and/or video processing system 1316 that processes audio data and/or passes through the audio and video data to an audio system 1318 and/or to a display system 1322 (e.g., a video buffer or a screen of a smart phone or camera). The audio system 1318 and/or the display system 1322 may include any devices that process, display, and/or otherwise render audio, video, display, and/or image data. Display data and audio signals can be communicated to an audio component and/or to a display component via an RF (radio frequency) link, S-video link, HDMI (high-definition multimedia interface), composite video link, component video link, DVI (digital video interface), analog audio connection, or other similar communication link, such as media data port 1324. In some implementations, the audio system 1318 and/or the display system 1322 are external or separate components of the electronic device 1300. Alternatively, the display system 1322 can be an integrated component of the example electronic device 1300, such as part of an integrated touch interface.

The electronic device 1300 of FIG. 13 is an example implementation of the devices 102, 104, 424, and 426 of, e.g., FIGS. 1-4 et. seq. Thus, the processor 1308 is an example of the processor 112 or 122. Also, the memory device 1312 is an example of the computer-readable storage medium 114 or 124, as further indicated by the illustrated beamforming enhancement module 116 or 126. The electronic device 1300 may further include, e.g. as part of a communication unit 120, 130, or 402 (of FIGS. 1 and 4), at least one antenna, at least one transceiver, at least one amplifier, at least one baseband processor, and so forth. Thus, the principles of beamforming enhancement via strategic resource utilization as described herein can be implemented by, or in conjunction with, the electronic device 1300 of FIG. 13.

Unless context dictates otherwise, use herein of the word "or" may be considered use of an "inclusive or," or a term that permits inclusion or application of one or more items that are linked by the word "or" (e.g., a phrase "A or B" may be interpreted as permitting just "A," as permitting just "B," or as permitting both "A" and "B"). Also, items represented in the accompanying figures and terms discussed herein may be indicative of one or more items or terms, and thus reference may be made interchangeably to single or plural forms of the items and terms in this written description. Although implementations for beamforming enhancement via strategic resource utilization have been described in language specific to certain features and/or methods, the subject of the appended claims is not necessarily limited to the specific features or methods described. Rather, the specific features and methods are disclosed as example implementations for beamforming enhancement via strategic resource utilization.

What is claimed is:

1. A method for enhancing beamforming in a wireless system, the method comprising a base station:
    monitoring communications with multiple end-user devices;
    determining, based on the monitoring, a respective activity level for each end-user device of the multiple end-user devices based on how frequently each end-user device of the multiple end-user devices communicates via a beamformed signal;
    classifying each end-user device of the multiple end-user devices into an active beamforming state or an idle beamforming state based on the respective determined activity level of each end-user device;
    allocating resource units from an air interface resource to each end-user device of at least a portion of the multiple end-user devices based on a beamforming state into which each end-user device is classified, including:
        for each of the at least a portion of the multiple end-user devices that is classified into the active beamforming state, scheduling resource units from the air interface resource using at least one resource allocation rule that schedules a wireless communication to recur at a period that does not exceed a first temporal threshold corresponding to the active beamforming state; and
        for each of the at least a portion of the multiple end-user devices that is classified into the idle beamforming state, scheduling resource units from the air interface resource using the at least one resource allocation rule that schedules another wireless communication to recur at another period that does not exceed a second temporal threshold corresponding to the idle beamforming state, the first temporal threshold corresponding to the active beamforming state being shorter than the second temporal threshold corresponding to the idle beamforming state; and
    transmitting indications of the allocated resource units to the at least a portion of the multiple end-user devices.

2. The method of claim 1, wherein the allocating comprises scheduling, based on one or more resource allocation rules, the resource units on a temporal and frequency basis to provide, to both the at least a portion of the multiple end-user devices and the base station, opportunities for bidirectional beamforming training.

3. The method of claim 1, wherein the classifying comprises classifying each end-user device of the multiple end-user devices into the active beamforming state, the idle beamforming state, or an inactive beamforming state based on the respective determined activity level of each end-user device.

4. The method of claim 1, wherein the allocating comprises scheduling both control communications and data communications on one or more same frequency ranges for a given end-user device that is classified into the active beamforming state.

5. A base station for enhancing beamforming in a wireless system, the base station comprising:
    a communication unit including multiple antennas;
    at least one hardware-based processor; and
    one or more computer-readable storage media including a beamforming enhancement module configured to be executed by the at least one hardware-based processor to generate signal beams using the multiple antennas in accordance with an air interface signaling protocol, the air interface signaling protocol including:
        classification of multiple end-user devices into an active beamforming state or an idle beamforming state based on how frequently each end-user device of the multiple end-user devices communicates via a beamformed signal;
        allocation of resource units of an air interface resource based on the classification and one or more resource allocation rules that provide repeated opportunities for bidirectional beamforming training for at least a portion of the multiple end-user devices and the base station, including:

for each of the at least a portion of the multiple end-user devices that is classified into the active beamforming state, scheduling resource units from the air interface resource using at least one resource allocation rule that schedules a wireless communication to recur at a period that does not exceed a first temporal threshold corresponding to the active beamforming state; and for each of the at least a portion of the multiple end-user devices that is classified into the idle beamforming state, scheduling resource units from the air interface resource using the at least one resource allocation rule that schedules another wireless communication to recur at another period that does not exceed a second temporal threshold corresponding to the idle beamforming state, the first temporal threshold corresponding to the active beamforming state being shorter than the second temporal threshold corresponding to the idle beamforming state; and transmission of indications of the allocated resource units from the base station to the at least a portion of the multiple end-user devices.

6. A base station for enhancing beamforming in a wireless system, the base station comprising:

one or more processors; and one or more computer-readable storage media storing modules that are executable by the one or more processors, the computer-readable storage media comprising:

one or more resource allocation rules;

an activity level determination module configured to determine a respective activity level of each end-user device of multiple end-user devices based on how frequently each end-user device of the multiple end-user devices communicates via a beamformed signal;

a beamforming state classification module configured to classify each end-user device of the multiple end-user devices into an active beamforming state or an idle beamforming state based on the respective determined activity level of each end-user device; and a resource allocation module configured to allocate resource units from an air interface resource to each end-user device of at least a portion of the multiple end-user devices based on the one or more resource allocation rules and a beamforming state into which each end-user device is classified, the resource allocation module further configured to:

for each of the at least a portion of the multiple end-user devices that is classified into the active beamforming state, schedule resource units from the air interface resource using at least one resource allocation rule that schedules a wireless communication to recur at a period that does not exceed a first temporal threshold corresponding to the active beamforming state; and for each of the at least a portion of the multiple end-user devices that is classified into the idle beamforming state, schedule resource units from the air interface resource using the at least one resource allocation rule that schedules another wireless communication to recur at another period that does not exceed a second temporal threshold corresponding to the idle beamforming state, the first temporal threshold corresponding to the active beamforming state being shorter than the second temporal threshold corresponding to the idle beamforming state.

7. The base station of claim 6, wherein the resource allocation module is configured to cause the base station to transmit a null downlink control information (DCI) indication using at least one signal beam based on the one or more resource allocation rules if no other downlink traffic is scheduled.

8. The base station of claim 6, wherein the resource allocation module is configured to produce a same number of uplink streams as a number of downlink streams in each layer based on the one or more resource allocation rules.

9. The method of claim 1, wherein:

the allocating comprises scheduling the resource units based on one or more channel factors; and the one or more channel factors correspond to at least one of how much a channel is varying, how quickly beamforming parameters are changing, or how closely a signal beam is to be tracked.

10. The method of claim 1, wherein the determining comprises determining the respective activity level for each end-user device of the multiple end-user devices based on a total number of wireless communication events in a given time period for each end-user device of the multiple end-user devices.

11. The method of claim 1, wherein the allocating of the resource units from the air interface resource to each end-user device of the at least a portion of the multiple end-user devices comprises:

granting a first downlink resource allocation to a first end-user device of the multiple end-user devices so as to precede a first uplink resource allocation for the first end-user device based on a first beamforming state into which the first end-user device is classified; and granting a second uplink resource allocation to a second end-user device of the multiple end-user devices so as to precede a second downlink resource allocation for the second end-user device based on a second beamforming state into which the second end-user device is classified.

12. The method of claim 11, wherein the allocating of the resource units from the air interface resource to each end-user device of the at least a portion of the multiple end-user devices comprises:

allocating the first downlink resource allocation on one or more same frequency ranges as the first uplink resource allocation; and allocating the second uplink resource allocation on the one or more same frequency ranges as the second downlink resource allocation.

13. The method of claim 12, wherein the one or more same frequency ranges comprise interlaced frequencies configured to cover a frequency assignment of at least one corresponding resource allocation.

14. The method of claim 11, wherein the first end-user device and the second end-user device comprise a same end-user device.

15. The method of claim 11, wherein:

the first downlink resource allocation is adjacent to the first uplink resource allocation; and the second uplink resource allocation is adjacent to the second downlink resource allocation.

16. The base station of claim 5, wherein the air interface signaling protocol includes:
- implementation of a subframe schedule, based on the one or more resource allocation rules, in which an allocation row corresponding to one or more ranges of frequency includes respective resource allocations to respective end-user devices of the multiple end-user devices, the respective resource allocations for a respective end-user device scheduled adjacently across respective boundaries between uplink and downlink regions that alternate on the subframe schedule.

17. The base station of claim 5, wherein the allocation of the resource units in accordance with the air interface signaling protocol includes:
- granting, using at least one second resource allocation rule, a first downlink resource allocation to a first end-user device so as to precede a first uplink resource allocation for the first end-user device based on a first beamforming state into which the first end-user device is classified, the first downlink resource allocation allocated on one or more same frequency ranges as the first uplink resource allocation; and
- granting, using the at least one second resource allocation rule, a second uplink resource allocation to a second end-user device so as to precede a second downlink resource allocation for the second end-user device based on a second beamforming state into which the second end-user device is classified, the second uplink resource allocation allocated on the one or more same frequency ranges as the second downlink resource allocation.

18. The base station of claim 6, wherein the resource allocation module is configured to:
- grant a first downlink resource allocation to a first end-user device of the multiple end-user devices so as to precede a first uplink resource allocation for the first end-user device based on a first beamforming state into which the first end-user device is classified; and
- grant a second uplink resource allocation to a second end-user device of the multiple end-user devices so as to precede a second downlink resource allocation for the second end-user device based on a second beamforming state into which the second end-user device is classified.

19. The base station of claim 18, wherein the resource allocation module is configured to:
- allocate the first downlink resource allocation on one or more same frequency ranges as the first uplink resource allocation; and
- allocate the second uplink resource allocation on the one or more same frequency ranges as the second downlink resource allocation.

20. The base station of claim 6, wherein the resource allocation module is configured to:
- adjust respective lengths of the first temporal threshold corresponding to the active beamforming state and the second temporal threshold corresponding to the idle beamforming state based on at least one of channel condition or cell congestion.

\* \* \* \* \*